(12) United States Patent
Wren et al.

(10) Patent No.: US 12,472,249 B2
(45) Date of Patent: Nov. 18, 2025

(54) GLYCONJUGATE VACCINES

(71) Applicants: London School of Hygiene & Tropical Medicine, London (GB); UCL Business LTD, London (GB)

(72) Inventors: Brendan Wren, London (GB); Jeremy Brown, London (GB); Jon Cuccui, London (GB)

(73) Assignees: UCL Business LTD, London (GB); London School of Hygiene & Tropical Medicine, London (GB)

( * ) Notice: Subject to any disclaimer, the term of this patent is extended or adjusted under 35 U.S.C. 154(b) by 0 days.

(21) Appl. No.: 18/742,842

(22) Filed: Jun. 13, 2024

(65) Prior Publication Data
US 2024/0382585 A1 Nov. 21, 2024

Related U.S. Application Data

(62) Division of application No. 17/052,485, filed as application No. PCT/EP2019/061266 on May 2, 2019, now Pat. No. 12,048,743.

(30) Foreign Application Priority Data

May 3, 2018 (EP) ..................................... 1807303

(51) Int. Cl.
*A61K 39/09* (2006.01)
*A61K 39/00* (2006.01)
*A61K 39/385* (2006.01)
*A61K 47/64* (2017.01)
*C07K 14/315* (2006.01)
*C12P 21/00* (2006.01)

(52) U.S. Cl.
CPC .......... *A61K 39/385* (2013.01); *A61K 39/092* (2013.01); *A61K 47/646* (2017.08); *C07K 14/3156* (2013.01); *C12P 21/005* (2013.01); *A61K 2039/6087* (2013.01)

(58) Field of Classification Search
None
See application file for complete search history.

(56) References Cited

U.S. PATENT DOCUMENTS

| | | |
|---|---|---|
| 11,576,958 B2 | 2/2023 | Malley et al. |
| 2012/0135037 A1 | 5/2012 | Mizel et al. |

FOREIGN PATENT DOCUMENTS

| | | |
|---|---|---|
| WO | 2006032499 A1 | 3/2006 |
| WO | 2017216286 A1 | 12/2017 |

OTHER PUBLICATIONS

Brendan Wren: "Development of low cost recombinant glycoconjugate vaccines", Nov. 26, 2018 (Nov. 26, 2018), XP055612404, Retrieved from the Internet: URL:https://www.tm.mahidol.ac.th/research/News &Events/ 2018_ 11_26/2018_ 11 _26.pdf [retrieved on Aug. 12, 2019].

Emily J. Kay et al: "Recombinant expression of *Streptococcus pneumoniae* capsular polysaccharides in *Escherichia coli*", Open Biology, vol. 6, No. 4, Apr. 1, 2016 (Apr. 1, 2016), p. 150243, XP055525931, DOI: 10.1098/rsob.150243 cited in the application.

J. Cuccui et al: "Exploitation of bacterial N-linked glycosylation to develop a novel recombinant glycoconjugate vaccine against Francisella tularensis", The Journal of Infectious Diseases, vol. 205, No. 7, May 22, 2013 (May 22, 2013), pp. 1056-130002, XP055107342, ISSN: 0022-1899, DOI: 10.1098/rsob.130002.

J. S. Brown et al: "Immunization with Components of Two Iron Uptake ABC Transporters Protects Mice against Systemic *Streptococcus pneumoniae* Infection", Infection and Immunity, vol. 69, No. 11, Nov. 1, 2001 (Nov. 1, 2001), pp. 6702-6706, XP055468471, US ISSN: 0019-9567, DOI: 10.1128/IAI. 69.11.6702-6706.2001 cited in the application.

Jomaa et al. "Antibodies to the Iron Uptake ABC Transporter Lipoproteins PiaA and PiuA Promote Opsonophagocytosis of *Streptococcus pneumoniae*" Infection and Immunity, Oct. 2005, p. 6852-6859.

Jon Cuccui et al: "Hijacking bacterial glycosylation for the production of glycoconjugates, from vaccines to humanised glycoproteins", Journal of Pharmacy and Pharmacology, vol. 67, No. 3, Sep. 22, 2014 (Sep. 22, 2014), pp. 338-350, XP055333703, London; GB ISSN: 0022-3573, DOI: 10.1111 /jphp.12321.

Kuo et al: "Characterization of a recombinant pneumolysin and its use as a protein carrier for pneumococcal type 18C conjugate vaccines.", Infection and Immunity, vol. 63, No. 7, Jul. 1, 1995 (Jul. 1, 1995), pp. 2706-2713, XP055033057, ISSN: 0019-9567, cited in the application.

Mark Reglinski et al: "A recombinant conjugated pneumococcal vaccine that protects against murine infections with a similar efficacy to Prevnar-13", Npj Vaccines, vol. 3, No. 1, Oct. 31, 2018 (Oct. 31, 2018), XP055612400, DOI: 10.1038/ s41 541 -01 8-0090-4.

PCT International Search Report with International Application No. PCT/EP2019/061266, Filing date: May 2, 2019, pp. 1-6.

PCT Written Opinion of the International Searching Authority, International Application No. PCT/EP2019/061266, Filing date May 2, 2019, pp. 1-12.

Wacker Michael et al: "Prevention of *Staphylococcus aureus* Infections by Glycoprotein Vaccines Synthesized in *Escherichia coli*", Journal of Infectious Diseases. JID, University of Chicago Press, US, vol. 209, May 1, 2014 (May 1, 2014), pp. 1551-1561, XP009181722, ISSN: 0022-1899, DOI: 10.1093/ INFDIS/JIT800.

Whalan et al. "PiuA and PiaA, iron uptake lipoproteins of *Streptococcus pneumoniae*, elicit serotype independent antibody responses following human pneumococcal septicaemia" FEMS Immunology and Medical Microbiology 43 (2005) 73-80.

*Primary Examiner* — S. Devi
(74) *Attorney, Agent, or Firm* — Martin Fessenmaier; Umberg Zipser LLP

(57) ABSTRACT

This invention relates to the use of *S. pneumoniae* protein antigens, such as NanA, PiuA and Sp0148, as carriers for immunogenic *S. pneumoniae* capsular polysaccharide. This may be useful for example in glycoconjugate vaccines able to generate a protective immune response against multiple capsular serotypes. Glycoconjugates, vaccine compositions and methods of manufacture and use are provided.

7 Claims, 6 Drawing Sheets

Specification includes a Sequence Listing.

SEQUENCE LISTING

```
Sequence total quantity: 41
SEQ ID NO: 1              moltype = DNA   length = 1138
FEATURE                   Location/Qualifiers
misc_feature              1..1138
                          note = (PiuA coding sequence) with sequons
source                    1..1138
                          mol_type = other DNA
                          organism = synthetic construct
SEQUENCE: 1
ggatccgaat tccattttaa ataaggagga ataacataat gaaaaagatt tggctggcgc   60
tggctggttt agttttagcg tttagcgcat cggcggcgca gggaggcgat cagaacgcga  120
ccggtggcgc cctagtggcc agcttcttgc tcctacttgg tgcatgtagt acaaactcaa  180
gcactagtca gacagagacc agtagctctg ctccaacaga ggtaaccatt aaaagttcac  240
tggacgaggt caaactttcc aaagttcctg aaaagattgt gacctttgac ctcggcgctg  300
cggatactat tcgcgcttta ggatttgaaa aaaatatcgt cggaatgcct acaaaaactg  360
ttccgactta tctaaaagac ctagtgggaa ctgtcaaaaa tgttggttct atgaaagaac  420
ctgatttaga agctatcgcc gcccttgagc ctgatttgat tatcgcttcg ccacgtacac  480
aaaaattcgt agacaaattc aaagaaatcg ccccaaccgt tctcttccaa gcaagcaagg  540
acgactactg gacttctacc aaggctaata tcgaatccatt agcaagtgcc ttcggcgaaa  600
ctggtacaca gaaagccaag gaagaattga ccaagctaga caagagcatc caagaagtcg  660
ctactaaaaa tgaaagctct gacaaaaaag cccttgcgat cctccttaat gaaggaaaaa  720
tggcagcctt tggtgccaaa tctcgttctc ctttcttgta ccaaaccctg aaattcaaac  780
caactgatac aaaatttgaa gactcacgcc acggacaagt agtcagcttt gaaagtgtca  840
aagaaatcaa ccctgacatc ctctttgtca tcaaccgtac ccttgccatc ggtgggggaca  900
actctagcaa cgacggtgtc ctagaaaatg cccttatcgc tgaaacacct gctgctaaaa  960
atggtaagat tatccaacta acaccagacc tctggtatct aagcggaggc ggacttgaat 1020
caacaaaact catgattgaa gacatacaaa agctttgaa aggaggcgat cagaacgcga 1080
ccggtggcca tcaccatcat caccatcatc accatcatta ttaagtcta gaggatcc    1138

SEQ ID NO: 2              moltype = AA   length = 360
FEATURE                   Location/Qualifiers
REGION                    1..360
                          note = 2 PiuA amino acid sequence with sequons,His tag and
                           leader peptide
source                    1..360
                          mol_type = protein
                          organism = synthetic construct
SEQUENCE: 2
MKKIWLALAG LVLAFSASAA QGGDQNATGG ALVASFLLLL GACSTNSSTS QTETSSSAPT   60
EVTIKSSLDE VKLSKVPEKI VTFDLGAADT IRALGFEKNI VGMPTKTVPT YLKDLVGTVK  120
NVGSMKEPDL EAIAALEPDL IIASPRTQKF VDKFKEIAPT VLFQASKDDY WTSTKANIES  180
LASAFGETGT QKAKEELTKL DKSIQEVATK NESSDKKALA ILLNEGKMAA FGAKSRFSFL  240
YQTLKFKPTD TKFEDSRHGQ EVSFESVKEI NPDILFVINR TLAIGGDNSS NDGVLENALI  300
AETPAAKNGK IIQLTPDLWY LSGGGLESTK LMIEDIQKAL KGGDQNATGG HHHHHHHHHH  360

SEQ ID NO: 3              moltype = AA   length = 311
FEATURE                   Location/Qualifiers
REGION                    1..311
                          note = (PiuA amino acid sequence)
source                    1..311
                          mol_type = protein
                          organism = synthetic construct
SEQUENCE: 3
ALVASFLLLL GACSTNSSTS QTETSSSAPT EVTIKSSLDE VKLSKVPEKI VTFDLGAADT   60
IRALGFEKNI VGMPTKTVPT YLKDLVGTVK NVGSMKEPDL EAIAALEPDL IIASPRTQKF  120
VDKFKEIAPT VLFQASKDDY WTSTKANIES LASAFGETGT QKAKEELTKL DKSIQEVATK  180
NESSDKKALA ILLNEGKMAA FGAKSRFSFL YQTLKFKPTD TKFEDSRHGQ EVSFESVKEI  240
NPDILFVINR TLAIGGDNSS NDGVLENALI AETPAAKNGK IIQLTPDLWY LSGGGLESTK  300
LMIEDIQKAL K                                                      311

SEQ ID NO: 4              moltype = DNA   length = 3136
FEATURE                   Location/Qualifiers
misc_feature              1..3136
                          note = NanA coding sequence
source                    1..3136
                          mol_type = other DNA
                          organism = synthetic construct
SEQUENCE: 4
ggatccgaat tccattttaa ataaggagga ataacataat gaaaaagatt tggctggcgc   60
tggctggttt agttttagcg tttagcgcat cggcggcgca gggaggcgat cagaacgcga  120
ccggtggcga gcaacctctg gcaaatgaaa ctcaactttc ggggagagc tcaaccctaa  180
ctgatacaga aaagagccag ccttcttcag agactgaact ttctggcaat aagcaagaac  240
aagaaaggaa gataagcaa gagaaaaaa ttccaagaga ttactatgca cgagatttga  300
aaaatgtcga aacagtgata gaaaagaag atgttgaaac caatgcttca aatggtcaga  360
gagttgatttt atcaagtgaa ctagataaac taaagaaact tgaaacgca acagttcaca  420
tggagttttaa gccagatgcc aaggcccag cattctataa tctcttttct gtgtcaagtg  480
ctactaaaaa agatgagtac ttcactatgg cagtttacaa taatactgct accctagagg  540
ggcgtggttc ggatggggaaa cagttttaca ataattaca cgatgcaccc ttaaaagtta  600
```

```
aaccaggtca gtggaactct gtgactttca cagttgaaaa accgacagca gaactaccta     660
aaggccgagt gcgcctctac gtaaacgggg tattatctcg aacaagtctg agatctggca     720
atttcattaa agatatgcca gatgtaacgc atgtgcaaat cggagcaacc aagcgtgcca     780
acaatacggt ttgggggtca aatctacaga ttcggaatct cactgtgtat aatcgtgctt     840
taacaccaga agaggtacaa aaacgtagtc aacttttttaa acgctcagat ttagaaaaaa     900
aactacctga aggagcggct ttaacagaga aaacggacat attcgaaagc gggcgtaacg     960
gtaaaccaaa taaagatgga atcaagagtt atcgtattcc agcacttctc aagacagata    1020
aaggaacttt gatcgcaggt gcagatgaac gccgtctcca ttcgagtgac tggggtgata    1080
tcggtatggt catcagacgt agtgaagata atggtaaaac ttggggtgac cggataacca    1140
ttaccaactt acgtgacaat ccaaaagctt ctgacccatc gatcggttca ccagtgaata    1200
tcgatatggt gttggttcaa gatcctgaaa ccaaacgaat cttttctatc tatgacatgt    1260
tcccagaagg gaagggaatc tttgaatgt cttcacaaaa agaagaagcc tacaaaaaaa    1320
tcgatggaaa aacctatcaa atcctctatc gtgaaggaga aaagggagct tataccattc    1380
gagaaaatgg tactgtctat acaccagatg gtaaggcgac agactatcgc gttgttgtag    1440
atcctgttaa accagcctat agcgacaagg gggatctata caagggtaac caattactag    1500
gcaatatcta cttcacaaca aacaaaactt ctccatttag aattgccaag gatagctatc    1560
tatggatgtc ctacagtgat gacgacggga agacatggtc agcgcctcaa gatattactc    1620
cgatggtcaa agccgattgg atgaaattct tgggtgtagg tcctggaaca ggaattgtac    1680
ttcggaatgg gcctcacaag ggacggattt tgataccggt ttatacgact aataatgtat    1740
ctcacttaaa tggctcgcaa tcttctcgta tcatctattc agatgatcat ggaaaaactt    1800
ggcatgctgg agaagcggtc aacgataacc gtcaggtaga cggtcaaaag atccactctt    1860
ctacgatgaa caatagcgt gcgcaaaata cagaatcaac ggtggtacaa ctaaacaatg    1920
gagatgttaa actctttatg cgtggtttga ctggagatct tcaggttgct acaagtaaag    1980
acggaggagt gacttgggag aaggatatca acgttatcc acaggttaaa gatgtctatg    2040
ttcaaatgtc tgctatccat acgatgcacg aaggaaaaga atacatcatc ctcagtaatg    2100
caggtgacc gaaacgtgaa aatgggatgg tccacttggc acgtgtcgaa gaaatggtg    2160
agttgacttg gctcaaacac aatccaattc aaaaaggaga gtttgcctat aattcgctcc    2220
aagaattagg aaatggggag tatggcatct tgtatgaaca tactgaaaaa ggacaaaatg    2280
cctatcccct atcatttaga aaatttaatt gggacttttt gagcaaagat ctgatttctc    2340
ctaccgaagc gaaagtgaag cgaactagag agatgggcaa aggagttatt ggcttggagt    2400
tcgactcaga agtattggtc aacaaggctc caacccttca attggcaaat ggtaaaacag    2460
cacgcttcat gacccagtat gatacaaaaa ccctccatt tacagtggat tcagaggata    2520
tgggtcaaaa agttacaggt ttggcagaag gtgcaattga aagtatgcat aatttaccag    2580
tctctgtggc gggcactaag ctttcgaatg gaatgaacgg aagtgaagct gctgttcata    2640
aagtgccaga atacacaggc ccattaggga catccggcga agagccagcc ccgacagtcg    2700
agaagccaga atacacaggc ccactaggga catccggcga agagccagcc ccgacagtcg    2760
agaagccaga atacacaggc ccactaggga cagctggtga agaagcagct ccaacagtcg    2820
agaagccaga atttacaggg ggagttaatg gtacagagcc agctgttcat gaaatcgcag    2880
agtataaggg atctgattcg cttgtaactc ttactacaaa agaagattat acttacaaag    2940
ctcctcttgc tcagcaggca cttcctgaaa caggaaacaa ggagagtgac ctcctagctt    3000
cactaggact aacagctttc ttccttggtc tgtttacgct agggaaaaag agagaacaag    3060
gaggcgatca gaacgcgacc ggtggccatc accatcatca ccatcatcac catcattaat    3120
taagtctaga ggatcc                                                    3136

SEQ ID NO: 5             moltype = AA  length = 1026
FEATURE                  Location/Qualifiers
REGION                   1..1026
                         note = NanA amino acid sequence with sequons,His tag and
                          leader peptide
source                   1..1026
                         mol_type = protein
                         organism = synthetic construct
SEQUENCE: 5
MKKIWLALAG LVLAFSASAA QGGDQNATGG EQPLANETQL SGESSTLTDT EKSQPSSETE      60
LSGNKQEQER KDKQEEKIPR DYYARDLENV ETVIEKEDVE TNASNGQRVD LSSELDKLKK     120
LENATVHMEF KPDAKAPAFY NLFSVSSATK KDEYFTMAVY NNTATLEGRG SDGKQFYNNY     180
NDAPLKVKPG QWNSVTFTVE KPTAELPKGR VRLYVNGVLS RTSLRSGNFI KDMPDVTHVQ     240
IGATKRANNT VWGSNLQIRN LTVYNRALTP EEVQKRSQLF KRSDLEKKLP EGAALTEKTD     300
IFESGRNGKP NKDGIKSYRI PALLKTDKGT LIAGADERRL HSSDWGDIGM VIRRSEDNGK     360
TWGDRVTITN LRDNPKASDP SIGSPVNIDM VLVQDPETKR IFSIYDMFPE GKGIFGMSSQ     420
KEEAYKKIDG KTYQILYREG EKGAYTIREN GTVYTPDGKA TDYRVVVDPV KPAYSDKGDL     480
YKGNQLLGNI YFTTNKTSPF RIAKDSYLWM SYSDDDGKTW SAPQDITPMV KADWMKFLGV     540
GPGTGIVLRN GPHKGRILIP VYTTNNVSHL NGSQSSRIIY SDDHGKTWHA GEAVNDNRQV     600
DGQKIHSSTM NNRRAQNTES TVVQLNNGDV KLFMRGLTGD LQVATSKDGG VTWEKDIKRY     660
PQVKDVYVQM SAIHTMHEGK EYIILSNAGG PKRENGMVHL ARVEENGELT WLKHNPIQKG     720
EFAYNSLQEL GNGEYGILYE HTEKGQNAYT LSFRKFNWDF LSKDLISPTE AKVKRTREMG     780
KGVIGLEFDS EVLVNKAPTL QLANGKTARF MTQYDTKTLL FTVDSEDMGQ KVTGLAEGAI     840
ESMHNLPVSV AGTKLSNGMN GSEAAVHEVP EYTGPLGTSG EEPAPTVEKP EYTGPLGTSG     900
EEPAPTVEKP EYTGPLGTAG EEAAPTVEKP EFTGGVNGTE PAVHEIAEYK GSDSLVTLTT     960
KEDYTYKAPL AQQALPETGN KESDLLASLG LTAFFLGLFT LGKKREQGGD QNATGGHHHH    1020
HHHHHH                                                               1026

SEQ ID NO: 6             moltype = AA  length = 977
FEATURE                  Location/Qualifiers
REGION                   1..977
                         note = NanA amino acid sequence
source                   1..977
                         mol_type = protein
                         organism = synthetic construct
```

```
SEQUENCE: 6
EQPLANETQL  SGESSTLTDT  EKSQPSSETE  LSGNKQEQER  KDKQEEKIPR  DYYARDLENV   60
ETVIEKEDVE  TNASNGQRVD  LSSELDKLKK  LENATVHMEF  KPDAKAPAFY  NLFSVSSATK  120
KDEYFTMAVY  NNTATLEGRG  SDGKQFYNNY  NDAPLKVKPG  QWNSVTFTVE  KPTAELPKGR  180
VRLYVNGVLS  RTSLRSGNFI  KDMPDVTHVQ  IGATKRANNT  YVWGSNLQIRN  LTVYNRALTP  240
EEVQKRSQLF  KRSDLEKKLP  EGAALTEKTD  IFESGRNGKP  NKDGIKSYRI  PALLKTDKGT  300
LIAGADERRL  HSSDWGDIGM  VIRRSEDNGK  TWGDRVTITN  LRDNPKASDP  SIGSPVNIDM  360
VLVQDPETKR  IFSIYDMFPE  GKGIFGMSSQ  KEEAYKKIDG  KTYQILYREG  EKGAYTIREN  420
GTVYTPDGKA  TDYRVVVDPV  KPAYSDKGDL  YKGNQLLGNI  YFTTNKTSPF  RIAKDSYLWM  480
SYSDDDGKTW  SAPQDITPMV  KADWMKFLGV  GPGTGIVLRN  GPHKGRILIP  VYTTNNVSHL  540
NGSQSSRIIY  SDDHGKTWHA  GEAVNDNRQV  DGQKIHSSTM  NNRRAQNTES  TVVQLNNGDV  600
KLFMRGLTGD  LQVATSKDGG  VTWEKDIKRY  PQVKDVYVQM  SAIHTMHEGK  EYIILSNAGG  660
PKRENGMVHL  ARVEENGELT  WLKHNPIQKG  EFAYNSLQEL  GNGEYGILYE  HTEKGQNAYT  720
LSFRKFNWDF  LSKDLISPTE  AKVKRTREMG  KGVIGLEFDS  EVLVNKAPTL  QLANGKTARF  780
MTQYDTKTLL  FTVDSEDMGQ  KVTGLAEGAI  ESMHNLPVSV  AGTKLSNGMN  GSEAAVHEVP  840
EYTGPLGTSG  EEPAPTVEKP  EYTGPLGTSG  EEPAPTVEKP  EYTGPLGTAG  EEAAPTVEKP  900
EFTGGVNGTE  PAVHEIAEYK  GSDSLVTLTT  KEDYTYKAPL  AQQALPETGN  KESDLLASLG  960
LTAFFLGLFT  LGKKREQ                                                    977

SEQ ID NO: 7              moltype = DNA   length = 1003
FEATURE                   Location/Qualifiers
misc_feature              1..1003
                          note = Sp0148 coding sequence
source                    1..1003
                          mol_type = other DNA
                          organism = synthetic construct
SEQUENCE: 7
ggatccgaat tccattttaa ataaggagga ataacataat gaaaaagatt tggctggcgc     60
tggctggttt agtttagcg tttagcgcat cggcggcgca gggaggcgat cagaacgcga    120
ccggtggcgc agcccttgct cttgttgctg caggtgtgct tgcggcttgc tcaggggctg    180
ctaagaaaga aggagaagca gctagcaaga aagaaatcat cgttgcaacc aatggatcac    240
caaagccatt tatctatgaa gaaaatggcg aattgactgg ttacgagatt gaagtcgttc    300
gcgctatctt taaagattct gacaaatatg atgtcaagtt tgaaaagaca gaatggtcag    360
gtgtctttgc tggtcttgac gctgatcgtt acaatatggc tgtcaacaat cttagctaca    420
ctaaagaacg tgcggagaaa tacctctatg ccgcaccaat tgcccaaaat cctaatgtcc    480
ttgtcgtgaa gaaagatgac tctagtatca agtctctcga tgatatcggt ggaaaatcga    540
cggaagtcgt tcaagccact acatcagcta agcagttaga agcatacaat gctgaacaca    600
cggacaaccc aactatcctt aactactacta aggcagactt gcaacaaatc atggtacgtt    660
tgagcgatgg acaatttgac tataagattt tgataaaat cggtgttgaa acagtgatca    720
agaaccaagg tttggacaac ttgaaagtta tcgaacttcc aagcgaccaa caaccgtacg    780
tttaccccact tcttgctcag ggtcaagatg agttgaaatc gtttgtagac aaacgcatca    840
aagaacttta taaagatgga actcttgaaa aattgtctaa acaattcttc ggagacactt    900
atctaccggc agaagctgat attaaggag gcgatcagaa cgcgaccggt ggccatcacc    960
atcatcacca tcatccaccat cattaattaa gtctagagga tcc                   1003

SEQ ID NO: 8              moltype = AA   length = 315
FEATURE                   Location/Qualifiers
REGION                    1..315
                          note = Sp0148 amino acid sequence with sequons, His tag and
                          leader peptide
source                    1..315
                          mol_type = protein
                          organism = synthetic construct
SEQUENCE: 8
MKKIWLALAG  LVLAFSASAA  QGGDQNATGG  AALALVAAGV  LAACSGGAKK  EGEAASKKEI   60
IVATNGSPKP  FIYEENGELT  GYEIEVVRAI  FKDSDKYDVK  FEKTEWSGVF  AGLDADRYNM  120
AVNNLSYTKE  RAEKYLYAAP  IAQNPNVLVV  KKDDSSIKSL  DDIGGKSTEV  VQATTSAKQL  180
EAYNAEHTDN  PTILNYTKAD  LQQIMVRLSD  GQFDYKIFDK  IGVETVIKNQ  GLDNLKVIEL  240
PSDQQPYVYP  LLAQGQDELK  SFVDKRIKEL  YKDGTLEKLS  KQFFGDTYLP  AEADIKGGDQ  300
NATGGHHHHH  HHHHH                                                     315

SEQ ID NO: 9              moltype = AA   length = 266
FEATURE                   Location/Qualifiers
REGION                    1..266
                          note = Sp0148 amino acid sequence
source                    1..266
                          mol_type = protein
                          organism = synthetic construct
SEQUENCE: 9
AALALVAAGV  LAACSGGAKK  EGEAASKKEI  IVATNGSPKP  FIYEENGELT  GYEIEVVRAI   60
FKDSDKYDVK  FEKTEWSGVF  AGLDADRYNM  AVNNLSYTKE  RAEKYLYAAP  IAQNPNVLVV  120
KKDDSSIKSL  DDIGGKSTEV  VQATTSAKQL  EAYNAEHTDN  PTILNYTKAD  LQQIMVRLSD  180
GQFDYKIFDK  IGVETVIKNQ  GLDNLKVIEL  PSDQQPYVYP  LLAQGQDELK  SFVDKRIKEL  240
YKDGTLEKLS  KQFFGDTYLP  AEADIK                                        266

SEQ ID NO: 10             moltype = AA   length = 713
FEATURE                   Location/Qualifiers
source                    1..713
                          mol_type = protein
```

```
                        organism = Campylobacter jejuni
SEQUENCE: 10
MLKKEYLKNP YLVLFAMIIL AYVFSVFCRF YWVWWASEFN EYFFNNQLMI ISNDGYAFAE    60
GARDMIAGFH QPNDLSYYGS SLSTLTYWLY KITPFSFESI VLYMSTFLSS LVVIPIILLA   120
NEYKRPLMGF VAALLASIAN SYYNRTMSGY YDTDMLVIVL PMFILFFMVR MILKKDFFSL   180
IALPLFIGIY LWWYPSSYTL NVALIGLFLI YTLIFHRKEK IFYIAVISSS LTLSNIAWFY   240
QSAIIVILFA LFALEQKRLN FMIIGILGSV TLIFLILSGG VDPILYQLKF YIFRSDESAN   300
LTQGFMYFNV NQTIQEVENV DLSEFMRRIS GSEIVFLFSL FGFAWLLRKH KSMIMALPIL   360
VLGFLALKGG LRFTIYSVPV MALGFGFLLS EFKAILVKKY SQLTSNVCIV FATILTLAPV   420
FIHIYNYKAP TVFSQNEASL LNQLKNIANR EDYVVTWWDY GYPVRYYSDV KTLVDGGKHL   480
GKDNFFPSFA LSKDEQAAAN MARLSVEYTE KSFYALQNDI LKTDILQAMM KDYNQSNVDL   540
FLASLSKPDF KIDTPKTRDI YLYMPARMSL IFSTVASFAF INLDTGVLDK PFTFSTAYPL   600
DVKNGEIYLS NGVVLSDDFR SFKIGDNVVS VNSIVEINSI KQGEYKITPI DDKAQFYIFY   660
LKDSAIPYAQ FILMDKTMFN SAYVQMFFLG NYDKNLFDSV INSRDAKVFK LKI          713

SEQ ID NO: 11           moltype =    length =
SEQUENCE: 11
000

SEQ ID NO: 12           moltype = AA   length = 5
FEATURE                 Location/Qualifiers
REGION                  1..5
                        note = glycosylation sequon
source                  1..5
                        mol_type = protein
                        organism = synthetic construct
SEQUENCE: 12
DQNAT                                                                 5

SEQ ID NO: 13           moltype = AA   length = 21
FEATURE                 Location/Qualifiers
REGION                  1..21
                        note = DsbA leader sequence
source                  1..21
                        mol_type = protein
                        organism = synthetic construct
SEQUENCE: 13
MKKIWLALAG LVLAFSASAA Q                                              21

SEQ ID NO: 14           moltype = AA   length = 10
FEATURE                 Location/Qualifiers
REGION                  1..10
                        note = purification tag
source                  1..10
                        mol_type = protein
                        organism = synthetic construct
SEQUENCE: 14
MRGSHHHHHH                                                           10

SEQ ID NO: 15           moltype = AA   length = 8
FEATURE                 Location/Qualifiers
REGION                  1..8
                        note = purification tag
source                  1..8
                        mol_type = protein
                        organism = synthetic construct
SEQUENCE: 15
DYKDDDDK                                                              8

SEQ ID NO: 16           moltype = AA   length = 15
FEATURE                 Location/Qualifiers
REGION                  1..15
                        note = purification tag
source                  1..15
                        mol_type = protein
                        organism = synthetic construct
SEQUENCE: 16
KETAAAKFER QHMDS                                                     15

SEQ ID NO: 17           moltype = AA   length = 5
FEATURE                 Location/Qualifiers
REGION                  1..5
                        note = purification tag
source                  1..5
                        mol_type = protein
                        organism = synthetic construct
SEQUENCE: 17
RRRRR                                                                 5
```

-continued

```
SEQ ID NO: 18            moltype = AA   length = 6
FEATURE                  Location/Qualifiers
REGION                   1..6
                         note = purification tag
source                   1..6
                         mol_type = protein
                         organism = synthetic construct
SEQUENCE: 18
RRRRRR                                                                    6

SEQ ID NO: 19            moltype = AA   length = 6
FEATURE                  Location/Qualifiers
REGION                   1..6
                         note = purification tag
source                   1..6
                         mol_type = protein
                         organism = synthetic construct
SEQUENCE: 19
HHHHHH                                                                    6

SEQ ID NO: 20            moltype = AA   length = 7
FEATURE                  Location/Qualifiers
REGION                   1..7
                         note = purification tag
source                   1..7
                         mol_type = protein
                         organism = synthetic construct
SEQUENCE: 20
HHHHHHH                                                                   7

SEQ ID NO: 21            moltype = AA   length = 8
FEATURE                  Location/Qualifiers
REGION                   1..8
                         note = purification tag
source                   1..8
                         mol_type = protein
                         organism = synthetic construct
SEQUENCE: 21
HHHHHHHH                                                                  8

SEQ ID NO: 22            moltype = AA   length = 9
FEATURE                  Location/Qualifiers
REGION                   1..9
                         note = purification tag
source                   1..9
                         mol_type = protein
                         organism = synthetic construct
SEQUENCE: 22
HHHHHHHHH                                                                 9

SEQ ID NO: 23            moltype = AA   length = 10
FEATURE                  Location/Qualifiers
REGION                   1..10
                         note = purification tag
source                   1..10
                         mol_type = protein
                         organism = synthetic construct
SEQUENCE: 23
HHHHHHHHHH                                                               10

SEQ ID NO: 24            moltype = AA   length = 4
FEATURE                  Location/Qualifiers
REGION                   1..4
                         note = purification tag
source                   1..4
                         mol_type = protein
                         organism = synthetic construct
SEQUENCE: 24
CCCC                                                                      4

SEQ ID NO: 25            moltype = AA   length = 11
FEATURE                  Location/Qualifiers
REGION                   1..11
                         note = purification tag
source                   1..11
                         mol_type = protein
                         organism = synthetic construct
SEQUENCE: 25
FFFFFFFFFF F                                                             11
```

```
SEQ ID NO: 26          moltype = AA   length = 5
FEATURE                Location/Qualifiers
REGION                 1..5
                       note = purification tag
source                 1..5
                       mol_type = protein
                       organism = synthetic construct
SEQUENCE: 26
DDDDD                                                                    5

SEQ ID NO: 27          moltype = AA   length = 6
FEATURE                Location/Qualifiers
REGION                 1..6
                       note = purification tag
source                 1..6
                       mol_type = protein
                       organism = synthetic construct
SEQUENCE: 27
DDDDDD                                                                   6

SEQ ID NO: 28          moltype = AA   length = 7
FEATURE                Location/Qualifiers
REGION                 1..7
                       note = purification tag
source                 1..7
                       mol_type = protein
                       organism = synthetic construct
SEQUENCE: 28
DDDDDDD                                                                  7

SEQ ID NO: 29          moltype = AA   length = 8
FEATURE                Location/Qualifiers
REGION                 1..8
                       note = purification tag
source                 1..8
                       mol_type = protein
                       organism = synthetic construct
SEQUENCE: 29
DDDDDDDD                                                                 8

SEQ ID NO: 30          moltype = AA   length = 9
FEATURE                Location/Qualifiers
REGION                 1..9
                       note = purification tag
source                 1..9
                       mol_type = protein
                       organism = synthetic construct
SEQUENCE: 30
DDDDDDDDD                                                                9

SEQ ID NO: 31          moltype = AA   length = 10
FEATURE                Location/Qualifiers
REGION                 1..10
                       note = purification tag
source                 1..10
                       mol_type = protein
                       organism = synthetic construct
SEQUENCE: 31
DDDDDDDDDD                                                              10

SEQ ID NO: 32          moltype = AA   length = 11
FEATURE                Location/Qualifiers
REGION                 1..11
                       note = purification tag
source                 1..11
                       mol_type = protein
                       organism = synthetic construct
SEQUENCE: 32
DDDDDDDDDD D                                                            11

SEQ ID NO: 33          moltype = AA   length = 12
FEATURE                Location/Qualifiers
REGION                 1..12
                       note = purification tag
source                 1..12
                       mol_type = protein
                       organism = synthetic construct
SEQUENCE: 33
```

```
DDDDDDDDDD DD                                                                   12

SEQ ID NO: 34         moltype = AA   length = 13
FEATURE               Location/Qualifiers
REGION                1..13
                      note = purification tag
source                1..13
                      mol_type = protein
                      organism = synthetic construct
SEQUENCE: 34
DDDDDDDDDD DDD                                                                  13

SEQ ID NO: 35         moltype = AA   length = 14
FEATURE               Location/Qualifiers
REGION                1..14
                      note = purification tag
source                1..14
                      mol_type = protein
                      organism = synthetic construct
SEQUENCE: 35
DDDDDDDDDD DDDD                                                                 14

SEQ ID NO: 36         moltype = AA   length = 15
FEATURE               Location/Qualifiers
REGION                1..15
                      note = purification tag
source                1..15
                      mol_type = protein
                      organism = synthetic construct
SEQUENCE: 36
DDDDDDDDDD DDDDD                                                                15

SEQ ID NO: 37         moltype = AA   length = 16
FEATURE               Location/Qualifiers
REGION                1..16
                      note = purification tag
source                1..16
                      mol_type = protein
                      organism = synthetic construct
SEQUENCE: 37
DDDDDDDDDD DDDDDD                                                               16

SEQ ID NO: 38         moltype = AA   length = 8
FEATURE               Location/Qualifiers
REGION                1..8
                      note = strep-tag II
source                1..8
                      mol_type = protein
                      organism = synthetic construct
SEQUENCE: 38
WSHPQFEK                                                                        8

SEQ ID NO: 39         moltype = AA   length = 10
FEATURE               Location/Qualifiers
REGION                1..10
                      note = c-myc tag
source                1..10
                      mol_type = protein
                      organism = synthetic construct
SEQUENCE: 39
EQKLISEEDL                                                                      10

SEQ ID NO: 40         moltype = AA   length = 12
FEATURE               Location/Qualifiers
REGION                1..12
                      note = Cruz tag 09
source                1..12
                      mol_type = protein
                      organism = synthetic construct
SEQUENCE: 40
MKAEFRRQES DR                                                                   12

SEQ ID NO: 41         moltype = AA   length = 12
FEATURE               Location/Qualifiers
REGION                1..12
                      note = Cruz tag 22
source                1..12
                      mol_type = protein
                      organism = synthetic construct
```

SEQUENCE: 41
MRDALDRLDR LA                                                    12

GLYCONJUGATE VACCINES

RELATED APPLICATIONS

This application is a divisional application of U.S. Pat. No. 12,048,743 having Ser. No. 17/052,485, filed Nov. 2, 2020, which is a 371 application of PCT/EP2019/061266, filed May 2, 2019, which claims priority to EP application 1807303.1, filed May 3, 2018, all of which are incorporated by reference herein

FIELD

The present invention relates to glycoconjugate vaccines and methods for their production.

SEQUENCE LISTING

The content of the following submission on XML File is incorporated herein by reference in its entirety: a computer readable form (CRF) of the Sequence Listing (file name: 104264.0001US2_SequenceListing_REV1, date recorded: Jul. 19, 2024, size: 58.5 KB).

BACKGROUND

*Streptococcus pneumoniae* (the pneumococcus) is an obligate human pathogen that is one of the most common causes of pneumonia, septicaemia and meningitis, and consequently is responsible for a considerable burden of morbidity and mortality worldwide. *S. pneumoniae* meningitis is of particular concern owing to its high case fatality rate and the reduced quality of life associated with its neurological sequelae, especially amongst children and the elderly.

The introduction of the pneumococcal conjugate vaccine (PCV) has been very effective in reducing the incidence of *S. pneumoniae* infections, including meningitis caused by vaccine serotypes (1-8). For example, PCV has led to the considerable reduction in *S. pneumoniae* infections caused by vaccine serotypes in vaccinated children, and also in the unvaccinated adult population due to herd immunity (1, 2, 4, 13). However, the current PCV has three major disadvantages. Firstly, the dominant disease causing serotypes (STs) vary geographically and with age group, yet the existing PCV formulation is fixed and not readily altered. Thus the current PCV has a variable impact on *S. pneumoniae* incidence amongst different populations and/or diseases (9). For example *S. pneumoniae* meningitis continues to cause substantial morbidity and mortality worldwide especially in sub-Saharan Africa where a *S. pneumoniae* meningitis can affects as many as 98 per 100,000 children under one annually (38). Secondly, as there are over 90 *S. pneumoniae* capsular serotypes and PCV prevents nasopharyngeal colonisation (the bacterium's usual ecological niche) by only 13 of these, the introduction of PCV has been associated with a major expansion of non-vaccine serotypes including amongst meningitis cases (5, 7, 8). The natural competence of the bacterium indicates that the number of *S. pneumoniae* capsular serotypes is likely to increase further, leading to a coincident increase in disease incidence as the prevalence of non-vaccine serotypes expands (10-13). Thirdly, PCV vaccines are expensive, restricting their use in low and middle-income countries (LMICs), where the burden of disease is heaviest and preventing the vaccine from being cost effective in adults (14, 15). Hence a low cost *S. pneumoniae* vaccine that prevents childhood and adult disease, is flexible in antigen content to adjust for changes on *S. pneumoniae* ecology, and provides some form of cross-serotype protection remains a global imperative.

Current manufacture of PCV is expensive and time-consuming, requiring purification of individual capsular polysaccharides and a multistep process of chemical coupling to a protein carrier. The Wren group has pioneered an alternative approach termed Protein Glycan Coupling Technology (PGCT), using a *Campylobacter* oligosaccharyl-transferase enzyme, CjPglB, to produce recombinant protein/glycan structures in *Escherichia coli* (16, 17). PGCT requires co-expression in *E. coli* of the target glycan genes, a gene encoding the carrier protein antigen with additional 'glycotag' sequences to ensure protein/glycan conjugation, and the coupling enzyme CjPglB (18). Vaccine products are produced by a single step $Ni^{2+}$ affinity chromatography procedure from *E. coli* batch culture that can readily be scaled up for manufacture. In addition, PGCT would allow greater flexibility in the serotypes included within a PCV, allowing the vaccine to be tailored to the dominant serotypes in different target populations and geographical locations, and rapid reformulation in response to changes in *S. pneumoniae* ecology.

Another advantage of PGCT is that different protein antigens can be readily combined with the capsular antigen. The basic science of chemically conjugated vaccines has scarcely been advanced since their first commercialisation for *Haemophilus influenzae* type b in 1990. To date, only four major carrier proteins have been licensed in glycoconjugate vaccine formulations; deactivated toxins from *Clostridium tetanus* and *Corynebacterium diphtheria* ($CRM_{197}$), and surface expressed proteins of *H. influenza* (Protein D) and *N. meningitidis* serogroup B (19, 20). The immunological potential of a wide range of proteins has not been tested, yet the efficiency of the antibody response to the glycan component of a glyconconjugate varies between different peptides (21, 22). Identifying additional proteins that stimulate good antibody responses when fused to glycan antigens could aid development of glycoconjugate vaccines. Using an *S. pneumoniae* protein antigen as a carrier protein could also provide the additional advantage of inducing an adaptive response to the protein. Multiple *S. pneumoniae* protein antigens have been described that when used as vaccines can generate protective immunity in animal models through antibody-mediated opsonophagocytosis (23), inhibition of bacterial protein function (24, 25) and by stimulating Th17 cellular responses (26-28), some of which have been taken forward to phase 1 trials in man. Protective *S. pneumoniae* protein antigens could be used as carrier proteins for a PGCT approach to making a PCV that can result in serotype independent immunity mediated by adaptive immunity to the protein component. Such a vaccine may also have theoretical advantages in preventing meningitis as antibodies to selected surface protein antigens could prevent penetration of the blood brain barrier (29-31).

PCGT has been used to make an effective prototype vaccine against *Francisella tularensis* (32), and a *Shigella flexneri* PGCT vaccine has recently completed phase one trials (33). Recently, it was confirmed that PGCT can be used to make glycoconjugates with four different types of *S. pneumoniae* capsular serotypes, including serotype 4 (17). However, whether or not a PCV made using PGCT can induce protective anti-capsular responses, and has a similar efficacy to existing commercial PCVs has not been established. Furthermore, there are no data on whether *S. pneumoniae* protein antigens can act as effective carrier proteins for capsular antigen and are also able to stimulate protective responses.

SUMMARY

The present inventors have recognised that S. pneumoniae protein antigens can be used as carriers for an immunogenic S. pneumoniae capsular polysaccharide in a glycoconjugate vaccine that is able to generate a protective immune response against multiple capsular serotypes.

A first aspect of the invention provides a glycoprotein comprising a S. pneumoniae protein antigen glycosylated with an S. pneumoniae capsular polysaccharide.

Preferred S. pneumoniae protein antigens include NanA, PiuA and Sp0148, most preferably PiuA.

A second aspect of the invention provides a vaccine composition comprising one or more glycoproteins of the first aspect.

A third aspect of the invention provides a method of treatment of S. pneumoniae infection comprising;
administering a glycoprotein of the first aspect or a vaccine composition of the second aspect to an individual in need thereof.

A fourth aspect of the invention provides a glycoprotein of the first aspect or a vaccine composition of the second aspect for use in a method of treatment of S. pneumoniae infection in an individual.

Treatment of S. pneumoniae infection according to the third and fourth aspects may include prophylactic or protective treatment.

Other aspects and embodiments of the invention are described in more detail below.

BRIEF DESCRIPTION OF THE FIGURES

FIGS. 1A-E show anti capsular polysaccharide antibodies were measured using plates coated with purified type 4 capsular polysaccharide. Antiserum from Prevnar-13 (closed circles) and sham vaccinated (open squares) animals were used as controls. FIGS. 1F-H show anti carrier protein antibodies were measured from mice vaccinated with Combo (Sp4) (closed circles) or Combo (open squares) by sandwich ELISA using a monoclonal anti-His capture antibody and recombinant, unglycosylated carrier proteins. Data are displayed as mean±SEM from technical replicates.

FIG. 2C shows immunoblot analysis of concentrated lysate from ST4 and ST2 overnight cultures using pooled antiserum from the glycosylated and unglycosylated vaccine groups. Molecular mass markers are given in kilodaltons.

FIG. 3A shows examples of flow cytometry histograms for antibody deposition on a S. mitis strain expressing the S. pneumoniae serotype 4 capsule termed S. mitis (Sp4) in 10% antiserum from glycosylated (red shading) and unglycosylated (grey shading) vaccine groups. Sham vaccinated serum (dashed line) was included as a control. FIG. 3B shows antibody deposition measured using a flow cytometry assay on S. mitis (Sp4) in 10% murine antiserum (n=8) from glycosylated (closed circles) and unglycosylated (open squares) vaccine groups. Red dots indicate reactions containing reduced antiserum concentrations (5% vs 10%) in high titre samples. *p<0.05 Kruskal-Wallis with Dunn's post-test (vs PBS). FIG. 3C shows examples of flow cytometry histograms for antibody deposition on the TIGR4 S. pneumoniae strain in 2% (red shading), 0.2% (grey shading) and 0.02% (dashed line) antiserum from glycosylated vaccine groups. FIG. 3D shows antibody deposition on TIGR4 in pooled antiserum from mice vaccinated with glycosylated or unglycosylated vaccines. Deposition titres were determined using bacteria incubated with decreasing concentrations of Prevnar-13 antiserum to generate a standard curve. Results displayed as mean±SEM from technical replicates.

FIGS. 4A-D show representative histograms and antibody deposition on homologous and heterologous pneumococcal isolates in 1% pooled antiserum from mice vaccinated with glycosylated NanA (grey shading), Sp0148 (red shading) or PiuA (blue shading) or normal mouse serum (dashed line). Black bars represent the percentage of PE+ bacteria and grey bars represent the gMFI of the positive population. Gates were set such that 5-10% of events were PE$^+$ in the NMS reactions to account for strain specific differences in autofluorescence. Data are displayed as mean±SEM from technical replicates. FIG. 4E shows immunofluorescent staining of homologous and heterologous pneumococcal isolates using antiserum from mice vaccinated with the combination vaccine (green channel) and pneumococcal omni serum (red channel).

FIG. 5A shows examples of flow cytometry histograms for fresh human neutrophils incubated with FAM-SE labelled TIGR4 when opsonized in 20% antiserum from glycosylated (red shading) or unglycosylated (grey shading) vaccine groups and 5% baby rabbit complement. Sham vaccinated serum (dashed line) was included as a control. FIG. 5B shows percent association of fresh human neutrophils with TIGR4 when opsonized in 20% antiserum (n=8) from glycosylated (closed circles) or unglycosylated (open squares) vaccine groups and 5% baby rabbit complement. Antiserum from Prevnar-13 (closed circles) and sham vaccinated (open squares) animals were included as controls. *p<0.05 Kruskal-Wallis with Dunn's post-test (vs PBS). FIG. 5E shows percent association of fresh human neutrophils with non-type 4 pneumococci when opsonized in 20% antiserum (n=6) from glycosylated (closed circles) or unglycosylated (open squares) vaccine groups and 5% baby rabbit complement. Antiserum from Prevnar-13 (closed circles) and sham vaccinated (open squares) animals were included as controls.

DETAILED DESCRIPTION

Figure 1:
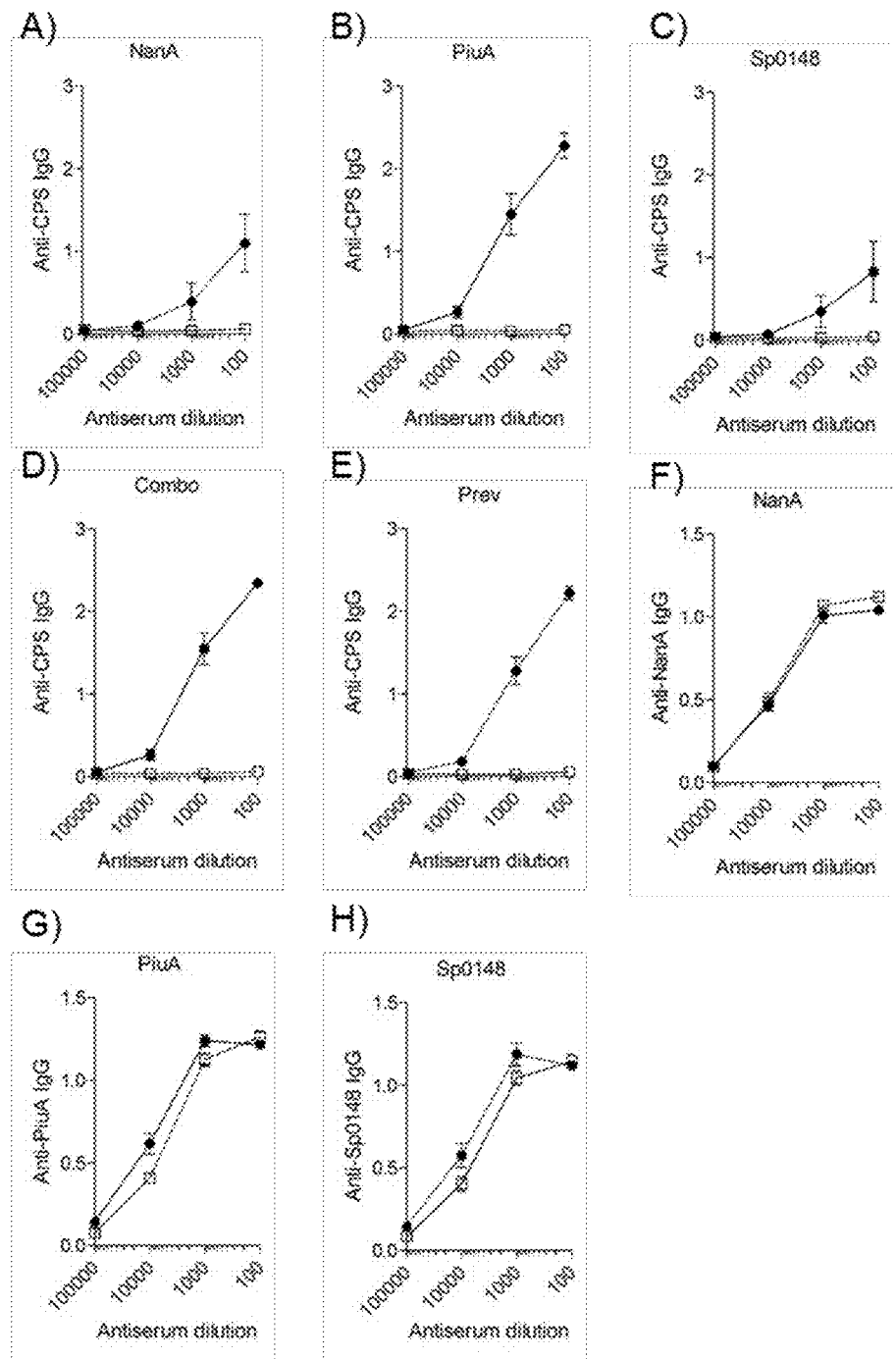
FIG. 1 shows that vaccination with recombinant glycoproteins generates antibodies to the pneumococcal capsule and carrier protein. Antibody levels in antiserum measured from mice (n=8) vaccinated with recombinant glycoproteins (closed circles) or cognate unglycosylated antigens (open squares) by ELISA.

This invention relates to recombinant glycoproteins for use in vaccine compositions, in particular glycoproteins comprising a *S. pneumoniae* protein antigen glycosylated with a *S. pneumoniae* capsular polysaccharide. These glycoproteins generate protective immune responses against multiple *S. pneumoniae* serovars and may be useful in the preventative or therapeutic treatment of *S. pneumoniae* infections, such as meningitis.

A glycoprotein described herein may comprise a *S. pneumoniae* protein antigen and one or more N-linked *S. pneumoniae* capsular polysaccharides i.e. the capsular polysaccharides may be covalently linked to Asn residues of the protein antigen (N-glycosylation). The capsular polysaccharides and the *S. pneumoniae* protein antigen may be heterologous i.e. the *S. pneumoniae* protein antigen may not be glycosylated with the capsular polysaccharide in natural systems.

Bacterial pathogen cells, such as *S. pneumoniae*, are commonly encapsulated by a polysaccharide capsule which forms a protective outer layer around the cell. Capsule polysaccharide may interact directly with host B cells and induce antibody synthesis in the absence of T-cells. An *S. pneumoniae* capsular polysaccharide may comprise one or more B cell epitopes. The polysaccharides in the capsule are homo- or heteropolymers of monosaccharide sub-units joined by glycosidic linkages. The configuration of the monosaccharide sub-units in the capsular polysaccharide differs between cells of different serotypes of the bacterial pathogen. For example, over 90 different capsular serotypes of *S. pneumoniae* have been identified to date.

An *S. pneumoniae* capsular polysaccharide for use in a glycoprotein described herein may include common *S. pneumoniae* serotypes, such as 1, 3, 4, 5, 6A, 6B, 7F, 9V, 14, 18C, 19A, 19F and 23F. The structures of capsular polysaccharides from *S. pneumoniae* serotypes are well-known in the art (Bentley and Spratt PLOS Genet. 2006 March; 2(3):e31. Epub 2006 Mar. 10).

In some preferred embodiments, the capsular polysaccharide may be a serotype 4 capsular polysaccharide.

A glycoprotein as described herein may comprise one or more capsular polysaccharide moieties, for example two, three, four, five or more capsular polysaccharide moieties. In some embodiments, a glycoprotein may comprise two capsular polysaccharide moieties. For example, capsular polysaccharide moieties may be attached to glycosylation sequons within the glycoprotein, for example at the N and C termini of the protein antigen.

Multiple capsular polysaccharide moieties attached to a glycoprotein may be the same polysaccharide or different polysaccharides.

The *S. pneumoniae* protein antigen may be any protein expressed in *S. pneumoniae* that is capable of eliciting an immune response, preferably a T cell response, in a host. For example, a *S. pneumoniae* protein may comprise one or more T-cell epitopes. Preferred *S. pneumoniae* protein antigens induce cross-protective immunity against multiple strains of *S. pneumoniae* and support strong antibody responses to capsular polysaccharide attached to it.

Suitable *S. pneumoniae* proteins are known in the art and include neuraminidase A (NanA; spr1536; EC3.2.1.18), PiuA (Sp1872), and Sp0148. most preferably PiuA (Sp1872).

A suitable PiuA protein antigen may comprise the amino acid sequence of database accession number KGI34864.1, AOG58833.1, ANO37655.1, KGI33012.1 or SEQ ID NO: 3 or a fragment or variant of any one of these.

A suitable NanA protein antigen may comprise the amino acid sequence of database accession number NP_359129.1 or SEQ ID NO: 6 or a fragment or variant of any one of these. For example, the protein antigen may comprise the N-terminal lectin-like domain of NanA.

A suitable Sp0148 protein antigen may comprise the amino acid sequence of database accession number ABJ55394.1 or WP_000724951.1 or SEQ ID NO: 9 or a fragment or variant of any one of these.

A variant of a reference polypeptide sequence, such as one of SEQ ID NOs: 3, 6, or 9 may comprise an amino acid sequence having at least 50%, at least 60%, at least 70%, at least 80%, at least 90%, at least 95%, at least 98% or at least 99% sequence identity to the reference polypeptide sequence.

Nucleotide and amino acid sequence identity is generally defined with reference to the algorithm GAP (GCG Wisconsin Package™, Accelrys, San Diego CA). GAP uses the Needleman & Wunsch algorithm to align two complete sequences that maximizes the number of matches and minimizes the number of gaps. Generally, the default parameters are used, with a gap creation penalty=12 and gap extension penalty=4. Use of GAP may be preferred but other algorithms may be used, e.g. BLAST, BLASTP or BLASTN (which use the method of Altschul et al., FASTA (which uses the method of Pearson and Lipman, or PSI-Search which uses the Smith-Waterman algorithm), generally employing default parameters [54-56, 75].

A protein antigen may, for example, comprise an amino acid sequence which differs from a reference polypeptide sequence, such as one of SEQ ID NOs: 3, 6, or 9 by insertion, addition, substitution or deletion of 1 amino acid, 2, 3, 4, 5-10, 10-20, 20-30, or 30-40 or more amino acids.

A protein antigen may be a fragment of a reference polypeptide sequence, such as one of SEQ ID NOs: 3, 6, or 9, or a variant of a reference polypeptide sequence. A fragment is a truncated polypeptide consisting of fewer amino acids than the full-length sequence that comprises at least one immunogenic determinant of the full-length sequence and retains immunogenicity. Suitable fragments may comprise at least 100, at least 150, at least 200, at least 250 or at least 300 amino acids of the full-length sequence.

A fragment of a full-length protein antigen is capable of raising an immune response (if necessary, when suitably adjuvanted) that recognises the full-length antigen as well as the *S. pneumoniae* serotype or strain from which the protein antigen was derived and preferably other serotypes or strains. Suitable fragments may for example be identified by in silico modelling of potential immunogenic sites, followed by the generation of panels of fragments, and in vivo testing in mammalian protection models.

Suitable protein antigens for use in vaccine compositions may lack a signal peptide sequence.

The *S. pneumoniae* protein antigen may comprise a glycosylation sequon. A glycosylation sequon is a short sequence of consecutive amino acids within a protein that forms the site of attachment for a polysaccharide moiety. The capsular polysaccharide may be covalently linked to an Asn residue within the glycosylation sequon of the protein antigen.

The choice of glycosylation sequon may depend on the oligosaccaryltransferase used to produce the glycoprotein. A suitable glycosylation sequon recognised by *Campylobacter jejuni* PglB may comprise the sequence D/E-Y-N-X-S/T, where Y and X are any amino acid except P. For example, the glycosylation sequon may comprise the sequence DQNAT (SEQ ID NO:13). Other glycosylation sequons suitable for use with other oligosaccaryltransferases may be readily determined.

The glycosylation sequon may be heterologous i.e. the sequon may not be naturally present in the sequence of the protein antigen and may be incorporated by recombinant techniques. Suitable methods for incorporating a glycosylation sequon into the sequence of a protein antigen are well-known in the art. In some embodiments, a heterologous glycosylation sequon may be flanked by linker residues, such as one or more G residues, for example G, or GG.

The protein antigen may comprise one glycosylation sequon or multiple glycosylation sequons. For example, a protein antigen may comprise two glycosylation sequons. Conveniently, the glycosylation sequons may be located at the N terminus of the protein antigen (or immediately adjacent to the N terminal leader sequence) or at the C terminus of the protein antigen (or immediately adjacent to the C terminal purification tag).

In some embodiments, a protein antigen may be coupled to a leader peptide to direct secretion of the glycoprotein from cell into the culture medium as a precursor. A range of suitable leader peptides are known in the art and include the DsbA leader sequence MKKIWLALAGLVLAFSASAAQ (SEQ ID NO:13) or a variant thereof. The leader peptide may be heterologous to the protein antigen i.e. it may be a leader sequence that is not naturally associated with the protein antigen. The leader peptide may be located at the N terminus of the precursor glycoprotein. The leader peptide is removed by post-translational processing after expression of the precursor to generate the glycoprotein.

The glycoprotein may further comprise a purification tag. A purification tag is a heterologous amino acid sequence which forms one member of a specific binding pair. Polypeptides containing the purification tag may be detected, isolated and/or purified through the binding of the other member of the specific binding pair to the polypeptide. For example, the purification tag may form an epitope which is bound by an antibody molecule.

Various suitable purification tags are known in the art, including, for example, MRGS(H)$_6$ (SEQ ID NO: 14), DYKDDDDK (SEQ ID NO: 15) (FLAG™), T7-, S-(KET-AAAKFERQHMDS) (SEQ ID NO: 16), poly-Arg ($R_{5-6}$), poly-His ($H_{6-10}$), poly-Cys ($C_4$) poly-Phe ($F_{11}$) poly-Asp ($D_{5-16}$), Strept-tag II (WSHPQFEK) (SEQ ID NO: 38), c-myc (EQKLISEEDL) (SEQ ID NO: 39), Influenza-HA tag [66], Glu-Glu-Phe tag [67], Tag. 100 (Qiagen; 12 aa tag derived from mammalian MAP kinase 2), Cruz tag 09™ (MKAEFRRQESDR (SEQ ID NO: 40), Santa Cruz Biotechnology Inc.) and Cruz tag 22™ (MRDALDRLDRLA (SEQ ID NO: 41), Santa Cruz Biotechnology Inc.).

In some preferred embodiments, a poly-His purification tag, such as a C-terminal (His)$_{10}$ sequence, may be employed. Following expression, the glycoprotein comprising the poly-His tag may be isolated by affinity chromatography using an affinity resin containing bound bivalent nickel or cobalt ions. The purification of poly-His tagged glycoproteins using affinity resins is well known in the art. Optionally, the poly-His tag may be removed by proteolytic cleavage after purification to produce the protein antigen.

A suitable S. pneumoniae protein antigen comprising glycosylation sequons, His tag and leader peptide may comprise the amino acid sequence of any one of SEQ NOs: 2, 5 or 7, or a fragment or variant of any one of these. Also disclosed herein are SEQ NOs: 2, 5 or 7 without the leader peptide and optionally the His tag.

A glycoprotein described above may be produced by any suitable method. Preferably, a glycoprotein is produced by Protein Glycan Coupling Technology (PGCT) (see for example 16-18, 41, 42). For example, a method of producing a glycoprotein as described herein may comprise;
  expressing in a microbial cell;
    (i) an oligosaccharyltransferase;
    (ii) a S. pneumoniae capsular polysaccharide; and
    (iii) a S. pneumoniae protein antigen;
  such that the oligosaccharyltransferase glycosylates the pathogen protein antigen with the pathogen capsular polysaccharide to produce the glycoprotein.

The microbial cell may be a prokaryotic cell, preferably an E. coli cell.

A microbial cell for the production of a glycoprotein may comprise (i) heterologous nucleic acid encoding an oligosaccharyltransferase, (ii) a heterologous capsular polysaccharide biosynthesis locus and (iii) heterologous nucleic acid encoding a pathogen protein antigen. The heterologous nucleic acids and locus may be present on extrachromosomal plasmids in the microbial cell or may be integrated into the genome of the microbial cell.

The microbial cell may be produced by a method comprising transforming a microbial cell with;
    (i) heterologous nucleic acid encoding an oligosaccharyltransferase;
    (ii) a heterologous S. pneumoniae capsular polysaccharide biosynthesis locus; and
    (iii) heterologous nucleic acid encoding a S. pneumoniae protein antigen.

Suitable methods of transforming microbial cells are well-known in the art. The heterologous nucleic acids and locus may be contained in one or more vectors, for example plasmids. In some embodiments, the heterologous nucleic acids and locus may all be contained in separate vectors. In other embodiments, two or more of the heterologous nucleic acids and heterologous locus may be contained in the same vector.

The microbial cell may be cultured under standard conditions in a cell culture vessel, such as a bioreactor or fermenter, in order to express the oligosaccharyltransferase, protein antigen and capsular polysaccharide.

Oligosaccharyltransferase (EC 2.4.1.119) catalyses the glycosylation of the Asn residue of a glycosylation sequon of the protein antigen with the capsular polysaccharide. A suitable oligosaccharyltransferase for the attachment of any particular capsular polysaccharide substrate may be readily identified using standard techniques. In some preferred embodiments, the oligosaccharyltransferase may be PglB, preferably a bacterial PglB, such as Helicobacter pullorum PglB, Desulfovibrio desulfuricans PglB, Campylobacter lari PglB, and Campylobacter jejuni PglB. A preferred PglB may comprise the amino acid sequence of database accession number ASI87642.1 or YP_002344519.1 or SEQ ID NO: 10 or a variant or fragment thereof.

S. pneumoniae protein antigens and S. pneumoniae capsular polysaccharides are described in more detail above. An S. pneumoniae capsular polysaccharide for attachment using PGCT may be attached to an undecaprenol pyrophosphate lipid anchor. In some embodiments, for example when the oligosaccharyltransferase is Campylobacter jejuni PglB, the capsular polysaccharide may comprise a reducing-end sugar containing an acetamido group in the C2 position.

The S. pneumoniae capsular polysaccharide may be produced in the microbial cell from a heterologous capsular polysaccharide biosynthesis locus or operon. A polysaccharide biosynthesis locus is a region of the S. pneumoniae genome that comprises the genes that are required to generate the capsular polysaccharide in the microbial cell. The polysaccharide biosynthesis locus is located in the S. pneu-

*moniae* genome between the AliA and DexB genes and has four conserved genes at its N terminal end. Polysaccharide biosynthesis loci for different *S. pneumoniae* serovars have been reported in the art (see for example, Bentley and Spratt PLOS Genet. 2006 March; 2 (3): e31. Epub 2006 Mar. 10) and may be identified in any *S. pneumoniae* genome using standard genetic analysis techniques.

The biosynthesis locus for an *S. pneumoniae* capsular polysaccharide may be obtained from cells of an *S. pneumoniae* serovar and cloned into a vector for expression in the microbial cell to generate the capsular polysaccharide. The generation of capsular polysaccharides from heterologous biosynthesis loci in a cell is well-established in in the art (16-18, 41, 42).

The glycoprotein may be isolated and/or purified, after production in the microbial cell. This may be achieved using any convenient method known in the art. Techniques for the purification of recombinant glycoprotein are well-known in the art and include, for example HPLC, FPLC or affinity chromatography. In some embodiments, purification may be performed using an affinity tag on the glycoprotein, as described above.

The glycoprotein may be formulated with a pharmaceutically acceptable excipient and optionally an adjuvant and/or one or more different glycoproteins as described herein, for example to produce an immunogenic formulation or vaccine composition for therapeutic use. Vaccine compositions are described in more detail above Both the capsular polysaccharide and the protein antigen are immunogenic and an adaptive immune response against both capsular polysaccharide and the protein antigen may be elicited in an individual to whom the glycoprotein is administered. The immune response may include T cell dependent immune responses and T-cell independent immune responses, such as antibody production. In some preferred embodiments, a glycoprotein may elicit both T cell dependent immune responses and T-cell independent immune responses.

The glycoprotein may be capable of providing a protective immune response against *S. pneumoniae*. For example, the glycoprotein may stimulate, promote or enhance a protective immune response when the individual is subsequently exposed to *S. pneumoniae*. The glycoprotein may stimulate a protective immune response against the *S. pneumoniae* serotype from which the capsular polysaccharide and/or protein antigen was derived or *S. pneumoniae* serotypes other than the *S. pneumoniae* serotype from which the capsular polysaccharide and/or protein antigen was derived. For example, the glycoprotein may stimulate protective immune responses against multiple *S. pneumoniae* serotypes. In some embodiments, a protective immune response may be serotype independent.

One or more glycoproteins as described above may be formulated into a vaccine composition.

A vaccine composition is an immunogenic formulation comprising one or more immunogenic components that is capable of generating protective immune responses in an individual to the one or more immunogenic components. The immunogenic components of the vaccine composition described herein may be contained in the *S pneumoniae* protein antigens and *S pneumoniae* capsular polysaccharides of the one or more glycoproteins.

The vaccine compositions described herein comprise protein and polysaccharide antigens from *S. pneumoniae* that are capable of eliciting an immune response against *S. pneumoniae* in an individual. The protein and polysaccharide antigens may, for example, be immunoreactive against *S. pneumoniae*-exposed serum, such as *S. pneumoniae* exposed human serum.

A vaccine composition may comprise one glycoprotein as described above or more preferably, multiple glycoproteins, for example 2, 3, 4, 5, 6, 7, 8, 9, 10 or more different glycoproteins. The multiple glycoproteins in the composition may comprise multiple different protein antigens and/or multiple different capsular polysaccharides. For example, the vaccine composition may comprise glycoproteins with multiple different *S. pneumoniae* capsular polysaccharides and the same *S. pneumoniae* protein antigen; multiple different *S. pneumoniae* protein antigens and the same *S. pneumoniae* capsular polysaccharide; or multiple different *S. pneumoniae* protein antigens and multiple different *S. pneumoniae* capsular polysaccharides.

A vaccine composition may further comprise an adjuvant. An adjuvant is a non-immunogenic agent that increases or enhances the immune response to an antigen in an individual (for a review, see, e.g, and Vaccine Adjuvants: adjuvants: preparation methods and research protocols Ed O'Hagan (2000) Springer).

Examples of suitable adjuvants include aluminium and aluminium salts such as aluminium hydroxide and/or aluminium phosphate; oil-emulsion compositions (or oil-in-water compositions), including squalene-water emulsions, such as Emulsigen™ (MVP Technologies Inc), Addavax™ and MF59™ (see, for example WO 90/14837); saponin formulations, such as, for example, QS21 and Immunostimulating Complexes (ISCOMS) (see for example U.S. Pat. No. 5,057,540; WO 90/03184, WO 96/11711, WO 2004/004762, WO 2005/002620); Toll-like receptor (TLR) agonists, such as TLR7 agonists (see for example WO 2012/117377), optionally in combination with an aluminium salt; bacterial or microbial derivatives, such as monophosphoryl lipid A (MPL), 3-O-deacylated MPL (3dMPL), flagellin, CpG-motif-containing oligonucleotides, muramyl dipeptide (MDP) and/or trehalose dycorynemycolate (TDM) ADP-ribosylating bacterial toxins, such as *E. coli* heat labile enterotoxin LT and cholera toxin CT and their non-enzymatic binding subunits, poly I:C, anionic polymers, including acrylic acid polymers, such as polymethylmethacrylate, acrylic acid crosslinked with allyl sucrose (for example Carbopol™, Lubrizol and polyethylene-imine (PEI)), cytokines selected from the group consisting of e.g. GMCSF, interferon gamma, interferon alpha, interferon beta, interleukin 12, interleukin 23, interleukin 17, interleukin 2, interleukin 1, TGF, TNFα, and TNFβ.

A method of making a vaccine composition may comprise;

admixing one or more glycoproteins as described above with a pharmaceutically or veterinarily acceptable excipient and optionally an adjuvant.

The term "pharmaceutically acceptable" or "veterinarily acceptable" as used herein pertains to compounds, materials, compositions, and/or dosage forms which are, within the scope of sound veterinary or medical judgement, suitable for use in contact with the tissues of a subject (e.g. human or other mammal) without excessive toxicity, irritation, allergic response, or other problem or complication, commensurate with a reasonable benefit/risk ratio. Each carrier, excipient, etc. must also be "acceptable" in the sense of being compatible with the other ingredients of the formulation.

Suitable excipients and carriers include, without limitation, water, saline, buffered saline, phosphate buffer, alcoholic/aqueous solutions, emulsions or suspensions. Other conventionally employed diluents, adjuvants, and excipients may be added in accordance with conventional techniques. Such carriers can include ethanol, polyols, and suitable mixtures thereof, vegetable oils, and injectable organic esters. Buffers and pH-adjusting agents may also be employed, and include, without limitation, salts prepared from an organic acid or base. Representative buffers include, without limitation, organic acid salts, such as salts of citric acid (e.g., citrates), ascorbic acid, gluconic acid, carbonic acid, tartaric acid, succinic acid, acetic acid, phthalic acid, Tris, trimethylamine hydrochloride, or phosphate buffers. Parenteral carriers can include sodium chloride solution, Ringer's dextrose, dextrose, trehalose, sucrose, lactated Ringer's, or fixed oils. Intravenous carriers can include fluid and nutrient replenishers, electrolyte replenishers, such as those based on Ringer's dextrose, and the like. Preservatives and other additives such as, for example, antimicrobials, antioxidants, chelating agents (e.g., EGTA; EDTA), inert gases, and the like may also be provided in the pharmaceutical carriers. The vaccine compositions described herein are not limited by the selection of the carrier. The preparation of these pharmaceutically-acceptable compositions, from the above-described components, having appropriate pH, isotonicity, stability and other conventional characteristics, is within the skill of the art.

Suitable carriers, excipients, etc. can be found in standard pharmaceutical texts, for example, Remington's Pharmaceutical Sciences [71] and The Handbook of Pharmaceutical Excipients, 4th edit., eds. R. C. Rowe et al, APhA Publications, 2003.

A vaccine composition may conveniently be presented in unit dosage form and may be prepared by any methods well-known in the art of pharmacy. Such methods include the step of bringing the one or more isolated immunogenic polypeptides into association with a carrier or excipient as described above which may constitute one or more accessory ingredients. In general, the formulations are prepared by uniformly and intimately bringing into association the active compound with liquid carriers or finely divided solid carriers or both.

Vaccine compositions described herein may be produced in various forms, depending upon the route of administration. For example, the vaccine compositions can be made in the form of sterile aqueous solutions or dispersions, suitable for injectable use, or made in lyophilized forms using freeze-drying techniques. Lyophilized vaccine compositions are typically maintained at about 4° C., and can be reconstituted in a stabilizing solution, e.g., saline or HEPES, with or without adjuvant. Vaccine compositions can also be made in the form of suspensions or emulsions.

These vaccine compositions may contain additives suitable for administration via any conventional route of administration. The vaccine compositions may be prepared for administration to subjects in the form of, for example, liquids, powders, aerosols, tablets, capsules, enteric-coated tablets or capsules, or suppositories. Thus, the vaccine compositions may also be in the form of, but are not limited to, suspensions, solutions, emulsions in oily or aqueous vehicles, pastes, and implantable sustained-release or biodegradable formulations. Compositions for sustained release or implantation may comprise pharmaceutically acceptable polymeric or hydrophobic materials, such as an emulsion, an ion exchange resin, a sparingly soluble polymer, or a sparingly soluble salt.

Formulations suitable for parenteral administration (e.g. by injection, including intramuscular), include aqueous and non-aqueous isotonic, pyrogen-free, sterile injection solutions which may contain anti-oxidants, buffers, preservatives, stabilisers, bacteriostats, and solutes which render the formulation isotonic with the blood of the intended recipient; and aqueous and non-aqueous sterile suspensions which may include suspending agents and thickening agents. Examples of suitable isotonic vehicles for use in such formulations include Sodium Chloride Injection, Ringer's Solution, or Lactated Ringer's Injection. Typically, the concentration of the active compound in the solution is from about 1 µg/ml to about 100 mg/ml, for example, from about 10 µg/ml to about 50 mg/ml. In some formulations for parenteral administration, the active ingredient may be provided in dry (i.e., powder or granular) form for reconstitution with a suitable vehicle (e.g., sterile pyrogen free water) prior to parenteral administration of the reconstituted composition.

Other useful parenterally-administrable formulations include those which comprise the active ingredient in microcrystalline form, in a liposomal preparation, or as a component of a biodegradable polymer system.

Vaccine compositions may be presented in unit-dose or multi-dose sealed containers, for example, ampoules and vials, and may be stored in a freeze-dried (lyophilised) condition requiring only the addition of the sterile liquid carrier, for example water for injections immediately prior to use.

The vaccine composition may be administered to a subject by any convenient route of administration. In some embodiments, administration is by parenteral routes, such as intramuscular, intranasal, trans-dermal or sub-cutaneous routes. For example, the vaccine composition may be administered by injection, preferably intramuscular injection.

It will be appreciated that appropriate dosages of the vaccine compositions can vary from individual to individual, or population to population, depending on the circumstances. Determining the optimal dosage will generally involve the balancing of the level of therapeutic benefit against any risk or deleterious side effects of the administration. The selected dosage level will depend on a variety of factors including, but not limited to, the route of administration, the time of administration, the rate of excretion of the vaccine composition, other drugs, compounds, and/or materials used in combination, and the species, breed, maturity, sex, weight, condition and general health of the individual. The amount of vaccine composition and route of administration will ultimately be at the discretion of the veterinary surgeon or physician, although generally the dosage will be to achieve serum concentrations of the vaccine composition which are sufficient to produce a beneficial effect without causing substantial harmful or deleterious side-effects.

Treatment may comprise the administration of a therapeutically effective amount of a vaccine composition to the individual. "Therapeutically effective amount" pertains to that amount of a vaccine composition that is effective for producing some desired therapeutic effect, commensurate with a reasonable benefit/risk ratio. For example, a suitable amount of a vaccine composition for administration to an individual may be an amount that generates a protective immune response against each polysaccharide or protein antigen that is present in the composition in the individual.

An individual to whom a vaccine composition described herein has been administered may display acquired and/or adaptive immune responses against *S pneumoniae* when subsequently exposed to it. These responses may confer protection against morbidity or mortality caused by infection with *S pneumoniae*. The vaccine composition may for example, reduce the likelihood of infection with *S pneumoniae*, reduce the severity or duration of the clinical signs of infection in the individual, prevent or delay the onset of clinical signs of infection or prevent or reduce the risk of the death of the individual following infection with *S pneumoniae*.

Administration in vivo can be effected in one dose, continuously or intermittently (e.g., in divided doses at appropriate intervals). In some embodiments, vaccine compositions may be administered more than once to the same individual with sufficient time interval to obtain a boosting effect in the individual, e.g., at least 1 week, 2 weeks, 3 weeks or 4 weeks, between administrations, preferably about 2 weeks. A prime dose of the vaccine composition may be administered to the individual followed by a booster dose. For example, a prime dose may be administered to a let at 1-4 weeks old and a booster dose at 3-6 weeks old. Methods of determining the most effective means and dosage of administration are well known to those of skill in the art and will vary with the formulation and the subject being treated. For example, in some embodiments, the prime dose of the vaccine composition may be administered when the levels of maternal derived antibodies in the let have declined (e.g. after 2-4 weeks) followed by a booster dose two weeks later. Single or multiple administrations may be carried out with the dose level and pattern being selected by the veterinary surgeon or physician.

A glycoprotein or vaccine composition as described herein may be for use in a method of treatment of the animal or human body. Aspects of the invention provide a glycoprotein or vaccine composition as described herein for use in the treatment of *S. pneumoniae* infection in an individual or population of individuals; the use of a glycoprotein or vaccine composition as described herein for the manufacture of a medicament for use in the treatment of *S. pneumoniae* infection in an individual or population of individuals; and a method of treating *S. pneumoniae* infection comprising administering a glycoprotein or vaccine composition as described herein to an individual or population of individuals in need thereof.

*S. pneumoniae* infection includes infection with *S. pneumoniae* of any serotype or strain, for example *S. pneumoniae* serotype 4, as well as clinical signs of *S. pneumoniae* infection, and conditions associated with *S. pneumoniae* infection, including bacterial meningitis, septicaemia, pneumonia, otitis media, cardiac infections, pericarditis, septic arthritis and spontaneous peritonitis.

*S. pneumoniae* infection may be identified or diagnosed using standard diagnostic criteria.

Treatment as described herein may prime the immune system of the individual or population to generate an immune response upon exposure to *S. pneumoniae*. This may achieve a desired therapeutic effect, for example, increased protection against or resistance to morbidity or mortality caused by *S. pneumoniae* infection.

More preferably, treatment as described herein may be prophylactic or preventative treatment i.e. the individual or population may not be suffering from *S. pneumoniae* infection and/or may not be displaying clinical signs of *S. pneumoniae* infection at the time of treatment. In some embodiments, the individual or population may be susceptible to or at risk of *S. pneumoniae* infection.

For example, the glycoprotein or vaccine composition may be useful in the vaccination or immunisation of an individual or population against *S. pneumoniae*. The treatment of *S. pneumoniae* infection as described herein may prevent subsequent *S. pneumoniae* infection in the individual or population or ameliorate its effects. Prophylactic or preventative treatment may reduce the susceptibility of the individual or population to *S. pneumoniae* infection, prevent or inhibit nasopharyngeal colonisation by *S. pneumoniae*, reduce the risk or likelihood of infection with *S. pneumoniae*, delay or reduce the severity or duration of lesions or other clinical signs of a *S. pneumoniae* infection, or prevent or delay the onset of clinical signs of *S. pneumoniae* in the individual or population, and/or reduce or prevent morbidity or mortality caused by a *S. pneumoniae* infection.

An individual or population suitable for treatment with a glycoprotein or vaccine composition described herein may be human or non-human mammal, for example a non-human mammal susceptible to *S. pneumoniae* infection, including equine mammals, such as horses.

A glycoprotein or vaccine composition described herein may reduce the incidence of *S. pneumoniae* related morbidity or mortality in a population relative to unimmunised populations. For example, the incidence of lesions or other clinical signs of *S. pneumoniae* infection may be reduced in the immunised population relative to unimmunised populations, following exposure to *S. pneumoniae*. In some embodiments, immunisation of a population with a vaccine composition as described herein may reduce the number of individuals in the population showing clinical signs of *S. pneumoniae* infection by at least 50% more preferably at least 60%, at least 65%, at least 70%, or at least 75%, most preferably at least 80% compared to an untreated population.

Other aspects and embodiments of the invention provide the aspects and embodiments described above with the term "comprising" replaced by the term "consisting of" and the aspects and embodiments described above with the term "comprising" replaced by the term "consisting essentially of".

It is to be understood that the application discloses all combinations of any of the above aspects and embodiments described above with each other, unless the context demands otherwise. Similarly, the application discloses all combinations of the preferred and/or optional features either singly or together with any of the other aspects, unless the context demands otherwise.

Modifications of the above embodiments, further embodiments and modifications thereof will be apparent to the skilled person on reading this disclosure, and as such, these are within the scope of the present invention.

All documents and sequence database entries mentioned in this specification are incorporated herein by reference in their entirety for all purposes.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

EXPERIMENTAL

The following experiments employ PGCT to conjugate an N-terminal fragment of the brain endothelial cell invasin NanA (29), the Th17 stimulating antigen Sp0148 (24) and the ABC transporter PiuA (34), to capsular serotype 4 antigen and test the efficacy of these glycoconjugates using mouse models of vaccination and *S. pneumoniae* infection.

1. Materials and Methods 1.1 Bacterial Strains and Growth Conditions

The bacterial strains used in this study are listed in Table 1. *Escherichia coli* isolates were routinely cultured in modified super optimal broth (SSOB) or agar at 28° C. Where appropriate cultures were supplemented with 100 μg/ml ampicillin, 20 μg/ml tetracycline and/or 80 μg/ml spectinomycin. *S. pneumoniae* were cultured on Columbia horse blood agar plates (E&O laboratories) or in brain heart infusion (BHI) broth at 37° C.±5% $CO_2$. Where appropriate, cultures were supplemented with 5 μg/ml gentamycin or 75 μg/ml streptomycin. *Streptococcus mitis* was cultured in Todd-Hewitt broth supplemented with 0.5% yeast extract at 37° C.±5% $CO_2$. *S. pneumoniae* and *S. mitis* were cultured to an $OD_{600}$ of approximately 0.4-08 and stored in single use 1 ml aliquots at −80° C. in 20% glycerol. Stocking densities were determined by serial dilution and plating.

1.2 Synthesis and Genetic Modification of Carrier Protein Genes

DNA sequences, codon optimised for expression in *E. coli*, encoding neuraminidase A (NanA, Spd1504) and the ABC transporter proteins PiuA (Sp1872) and Sp0148 were synthesized commercially in pUC57 and sub cloned into pEXT21. Owing to the size of full length NanA, which made recombinant production at high yields difficult in early experiments, the N-terminal lectin-like domain of the protein which is essential for protein function, was sub cloned from pEXT21 (nanA) as outlined in the supplementary methods (29). To facilitate PglB glycosylation, synthetic carrier protein sequences were modified with the sequon DQNAT (SEQ ID NO:12) flanked by two spacer glycine residues, at the N and C terminus of the mature protein. Periplasmic targeting was facilitated by exchanging native signal peptides for the DsbA leader sequence MKKIWLA-LAGLVLAFSASAAQ (SEQ ID NO:13). C-terminal deca-His sequences were included to facilitate Ni-NTA purification. In NanA, internal EcoRI and XbaI sites were replaced with synonymous mutations. Commercial plasmid constructs were cloned into library efficient DH5α cells (Life Technologies) according to the manufacturer's instructions and stored at −80° C. in 20% glycerol. Synthetic carrier protein sequences were sub cloned in the expression vector pEXT21 using the restriction enzymes EcoRI and XbaI (New England Biolabs).

1.3 Preparation of Expression Strains

*E. coli* W3110 and W311B pB4-4 cell cultures were inoculated 1:100 from overnights and grown to an $OD_{600}$ of 0.3-0.6. Cultures were chilled on ice, pelleted at 4000×g for 10 min and washed sequentially with 0.5 volumes and then 0.25 volumes of ice cold 10% glycerol. Competent cells were resuspended in $1/250^{th}$ volume ice cold 10% glycerol and 50 μl aliquots were transformed with pEXT21(nanA), pEXT21(piuA) or pEXT21(sp0148) in a 0.2 cm gap cuvette at 2.5 kV, 200Ω and 25 μF. To investigate the role of lipid linked Sp4 in the generation of anti-capsule immunity, W3110 pB4-4 cells were transformed with pEXT21 (piuA). Isolates confirmed for expression were stored at −80° C. in 20% glycerol.

1.4 Recombinant Protein Preparation

W3110 pEXT21 (nanA/piuA/sp0148) and W311B pB4-4 pEXT20 pEXT21 (nanA/piuA/sp0148) isolates were cultured overnight at 28° C. and sub cultured 1:100 into SSOB. The bacteria were cultured for 2-3 h prior to overnight induction with 1 mM IPTG and 4 mM $MnCl_2$ at 28° C. The cells were pelleted at 14,000×g and lysed using a pressure cell homogeniser (Stanstead). Lysates were treated with 25 U/ml Benzonase Nuclease (Sigma-Aldrich) for 20 min at RT and 0.2 μm filtered using Millex-GP Syringe Filters (Millipore). In initial studies, recombinant (glyco)proteins were purified using the Ni-NTA purification system (Thermo Fisher Scientific) according to the manufacturer's instructions. For vaccination studies, recombinant (glyco) proteins were isolated using GE Healthcare His-trap FF columns and an AKTA purifier with a linear imidazole gradient of 25 to 250 mM. Fractions containing only recombinant (glyco) proteins were identified by SDS-PAGE and Coomassie staining, pooled and buffer exchanged into PBS using Vivaspin 20 Centrifugal Concentrators (10,000 MWCO). Protein concentrations were determined using the Pierce Coomassie Plus (Bradford) Assay Kit (Thermo Fisher). Recombinant (glyco) proteins were filter sterilised, normalised to 200 μg/ml in PBS and stored at −80° C. Sample purity was confirmed by SDS-PAGE.

1.5 SDS-PAGE and Immunoblotting

Recombinant proteins (10 μl) were combined with 4 μl of 4×LDS sample buffer (thermos fisher) and 2 μl of 0.5 M dithiothreitol (Sigma-Aldrich) and heated to 70° C. for 10 min. Samples were separated on NuPAGE 12% bis-tris protein gels in MOPS buffer and transferred to nitrocellulose membrane using the iblot2 transfer system according to the manufacturer's instructions. Membranes were blocked with PBST supplemented with 2.5% skimmed milk powder (Marvel) and 0.1% normal goat serum (Thermo Fisher). Serotype 4 rabbit anti-capsule antibody (Statens Serum Institut, Denmark) and monoclonal mouse anti-His IgG (Abcam) were used as primary antibodies at a dilution of 1:1000 and 1:5000 respectively. After 1 h incubation membranes were washed three times with PBST and incubated for 45 min with secondary goat anti-rabbit IgG (IRDye800) and goat anti-mouse IgG (IRDye680) conjugate antibody at a dilution of 1:10000. Membranes were washed a further three times in PBST before detection with the LI-COR odyssey fluorescent imaging system (LI-COR Biosciences UK Ltd).

TIGR4 and D39 lysates were prepared by pressure lysis of overnight cultures. Lysates were 0.2 μm filtered and 10× concentrated using Vivaspin 20 Centrifugal Concentrators (10,000 MWCO). 10 μl aliquots of concentrated lysate were analysed by immunoblotting using a 1:1000 dilution of murine antiserum and a 1:10,000 dilution of goat anti-mouse IgG (IRDye800) as outlined above. Densitometry was performed using the LI-COR odyssey fluorescent imaging system.

1.6 Vaccination Studies

Female 5-6-week CD1 mice were purchased from Charles River and housed in cages of 4. For antiserum generation and pneumonia challenge studies mice were vaccinated intraperitoneally with 10 μg of recombinant (glyco) protein emulsified 1:1 in Sigma adjuvant (Sigma-Aldrich) on day 0. Booster immunisations were given subcutaneously on day 21 and 35. Positive control groups were vaccinated and boosted with 20 μl of Prevnar-13 (Wyeth) diluted 1:5 PBS. Negative control groups were sham vaccinated with PBS and Sigma adjuvant alone. Colonisation studies were performed using mice vaccinated intraperitoneally as outlined above and boosted intranasally under light isoflurane anaesthesia with 2 μg of recombinant protein (no adjuvant), or 20 μl of diluted Prevnar-13 or PBS. For pneumonia studies mice were infected with $1 \times 10^7$ CFU of TIGR4 in 50 μl of PBS under isoflurane anaesthesia. Mice were culled 24 h post infection and bacterial burdens in the lung and blood were assessed.

1.7 Anti-Capsule and Anti-Protein ELISAs

To measure anti-capsule responses, Nunc Maxisorp 96 well plates were coated with 0.5 µg/well purified type 4 pneumococcal polysaccharide (Statens Serum Institut, Denmark) in PBS overnight at 4° C. Wells were blocked with PBST supplemented with 2.5% skimmed milk powder and 0.1% normal goat serum and incubated with 10-fold dilutions of murine antiserum in PBS supplemented with 0.1% BSA and 0.01% sodium azide for 1 h at 28° C. Wells were washed three times with PBST and incubated with a 1:20,000 dilution of HRP-conjugated goat anti-mouse IgG (Abcam) 1 h at 28° C. Following a further three washes bound antibodies were detected using 50 µl of tetramethylbenzidine. The reaction was halted using 50 µl of 1M $H_2SO_4$ and the $OD_{450}$ was measured using an EL800 Microplate reader (BioTek Instruments) and a reference wavelength of $A_{630}$) Where appropriate anti-capsule antibody titres were determined by comparison to a standard curve generated using anti-Prevnar antiserum with an arbitrary titre of 1:10,000. Anti-protein responses were measured by sandwich ELISA using plates coated with 0.1 µg of monoclonal rabbit anti-his IgG (Abcam) in PBS overnight at 4° C. Wells were washed three times with PBST and incubated with 1 µg/well of recombinant protein in PBS for 2 h at 28° C. Following a further three washes, plates were blocked and incubated with 10-fold dilutions of murine antiserum and HRP-conjugated goat anti mouse IgG as outlined above.

For whole cell ELISAs, TIGR4 and D39 cultures were grown to an $OD_{600}$ of approximately 0.4-08, washed and resuspended to an $OD_{600}$ of 0.4 in 10% glycerol. Plates were incubated with 100 µl/well of normalised bacteria for 2 h at RT and bacteria were fixed with 4% formaldehyde for 20 min. Plates were washed and incubated with a 1:1000 dilution of murine antiserum for 2 h at 28° C. and HRP-conjugated goat anti mouse IgG as outlined above.

1.8 Antibody Deposition Assays

Antibody deposition assays were performed as previously described using frozen stocks of S. pneumoniae and S. mitis. Briefly, $2 \times 10^6$ CFU/well bacteria were incubated with diluted murine antiserum in a final volume of 50 µl for 30 min at 37° C. with agitation at 225 rpm. The bacteria were pelleted at 3000 rpm, washed twice with PBS and incubated for a further 30 min with a 1:100 dilution of PE-conjugate goat anti mouse IgG (25 µl/well). Following a further two washes, the bacteria were fixed with 200 µl/well of 4% paraformaldehyde and the fluorescence intensity of the bacterial population was measured by flow cytometry using the FACSVerse system. TIGR4 deposition titres were determined by comparison to a standard curve, generated using anti-Prevnar antiserum with an arbitrary titre of 1:10,000.

1.9 Opsonophagocytic Uptake Assays

Opsonophagocytic uptake assays were performed using neutrophils purified from healthy human donors using the MACSexpress magnetic purification system according to the manufacturer's instructions. Frozen stocks of S. pneumoniae were resuspended in 1 ml of 0.1 M sodium bicarbonate and incubated with FAM-SE for 30 min at 37° C. The bacteria were washed three times with PBS and $2 \times 10^6$ CFU/well bacteria were incubated with diluted murine antiserum in a final volume of 50 µl for 30 min at 37° C. with agitation at 225 rpm. $2 \times 10^4$ neutrophils were added per well in 50 µl of PBS and the reactions were incubated for a further 30 min. The reactions were fixed with 100 µl/well 4% paraformaldehyde and the fluorescence intensity of the neutrophil population was measured by flow cytometry using the FACSVerse system.

1.10 Statistical Analysis

Statistical analyses, appropriate for the group size and number of comparisons, were performed using GraphPad Prism. Flow cytometry data analysis was performed using FlowJo software.

1.11 Recombinant Protein Production

The N-terminal lectin-like domain of NanA was sub cloned from pEXT21 (nanA) using the primers listed in Table S2. Two fragments of the commercially synthesised NanA construct were amplified from pEXT21 (nanA) using Q5 High-Fidelity 2× Master Mix (New England Biolabs) and the primer pairs pEXT-F/nanA-R and pEXT-R/nanA-F with the conditions: 98° C. 10 s, 60° C. 30 s, 72° C. 30 s for 30 cycles. Fragments were PCR purified (QIAquick PCR Purification Kit, Qiagen) and digested with Avrll (New England Biolabs). Digested fragments were PCR purified and ligated using T3 DNA ligase (New England Biolabs). The religated reaction mixture was used as the template for NanA (N-terminus) amplification using the pEXT-F/pEXT-R primer pair as outlined above. The resulting insert was PCR purified and cloned into pEXT21 using the restriction enzymes EcoRI and XbaI. Plasmid pEXT21 (NanA), containing the lectin-like domain of NanA and the genetic components required for PglB glycosylation and Ni-NTA purification, was transformed into DH5α cells and stored at −80° C. in 20% glycerol.

2. Results

2.1 Vaccination With Recombinant Glycoconjugates Generates Antibodies Against the Capsule and Carrier Protein NanA (Sp4), PiuA (Sp4) and Sp0148 (Sp4) were prepared from isolates and used to vaccinate groups of eight F CD1 mice separately (10 µg/mouse/injection) or in combination (4 µg each protein/mouse/vaccination) as outlined above. Cognate unglycosylated antigens, Prevnar-13 and PBS alone (Sham) vaccine groups were included as controls for anti-protein and anti-capsule responses. In serum recovered from mice 7 days after the last vaccination, circulating anti-capsule antibodies were above the limit of detection in all glycosylated antigen groups, with no reactivity detected in groups vaccinated with protein alone (FIG. 1A-E). Anti-capsule antibody levels varied markedly between groups but did not appear to correlate with the relative levels of glycoprotein present within the different preparations. While the highest level of glycosylation occurred in the NanA samples, PiuA glycoconjugates stimulated the most robust anti-capsular immune responses (FIG. 1A). Vaccination with all three glycoconjugates combined generated a strong anti-capsule response that was similar to the response generated with Prevnar-13. Anti-carrier protein responses were assessed by sandwich ELISA and confirmed that all vaccine groups had seroconverted to the selected carrier proteins (FIG. 1F-H). Strong humoral immune responses were generated to the protein antigens regardless of whether they carried the serotype 4 glycan, indicating that glycosylation had no discernible effect on protein antigenicity.

Figure 2:
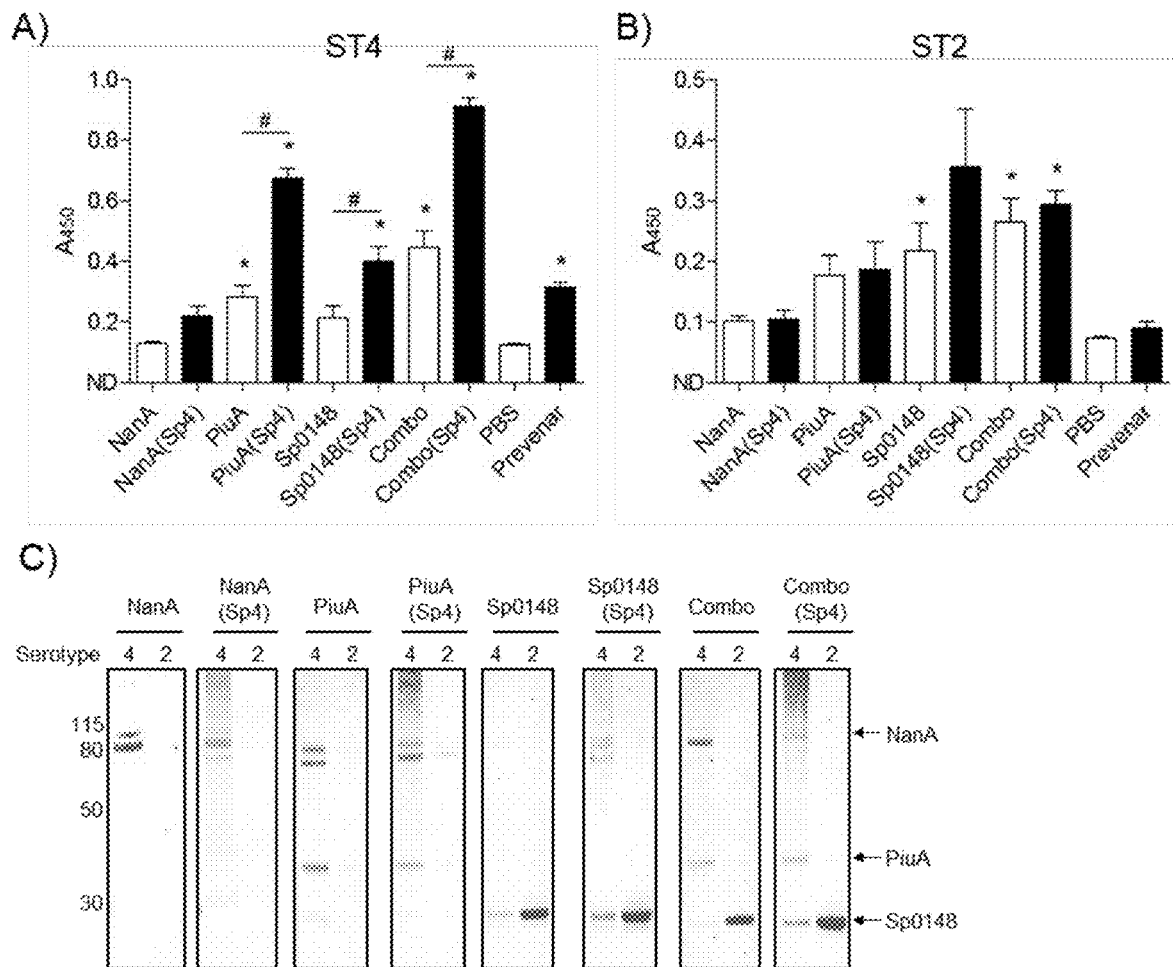
FIG. 2 shows that vaccination with recombinant glycoproteins generates antibodies that recognise homologous and heterologous pneumococcal isolates. Anti-ST4 (FIG. 2A) and anti-ST2 (FIG. 2B) antibodies were measured by whole cell ELISA using pooled antiserum from the glycosylated and unglycosylated vaccine groups. Data are displayed as mean±SEM from three separate cultures. *P<0.05 vs PBS #P<0.05 protein vs glycoprotein One-way ANOVA with Bonferroni's post-test.

2.2 Antibody Recognition of *S. pneumoniae* in Sera From Mice Vaccinated With Recombinant Glycoconjugates Antibody recognition of *S. pneumoniae* in sera from vaccinated mice was assessed using whole cell ELISAs and plates coated with the homologous *S. pneumoniae* serotype 4 TIGR4 and heterologous serotype 2 D39 strains (FIG. 2A-B). Sera from mice vaccinated with glycoconjugates recognised TIGR4 with a similar ELISA titre, for the Sp0148 group and higher titres for the PiuA or combined three protein glycoconjugates, as sera from mice vaccinated with Prevnar 13 (FIG. 2A). Mice vaccinated with the NanA glycoconjugate generated a non-significant increase in anti-TIGR4 titres. Significant antibody titres were also generated against TIGR4 in serum from mice vaccinated with the unglycosylated PiuA and the combination of all three proteins. As expected, the titres for the D39 whole cell ELISAs did not differ for sera recovered from mice vaccinated with the glycoconjugates or the corresponding proteins, with significant increases in antibody titre seen with mice vaccinated with Sp0148 or the combination of all three proteins (FIG. 2B). Recognition of natural pneumococcal antigens was confirmed by immunoblotting *S. pneumoniae* lysates with sera from mice vaccinated with the different PGCT glycoconjugates and their cognate proteins (FIG. 2C). Recognition of the three proteins selected for study was confirmed in TIGR4 lysates, as well as recognition of the type 4 pneumococcal capsule in the samples probed with glycoconjugate antiserum. Consistent with the results of the anti-capsule ELISAs (FIG. 2A), the different protein-glycan conjugates gave variable levels of reactivity with the serotype 4 capsule, with the strongest signal occurring with sera from mice vaccinated with the PiuA(Sp4) and Combo(Sp4) glycoconjugates. Consistent with the results of the whole cell ELISAs, the lipoproteins Sp0148 and PiuA were also identified when D39 lysates were probed with sera from vaccinated mice, although the PiuA signal was close to the limit of detection. Together these data indicate that vaccination with the glycoconjugate molecules generated antibodies that recognise both anti-capsular and anti-protein antigen and therefore homologous and heterologous *S. pneumoniae* isolates.

2.3 Vaccination with Recombinant Glycoconjugates Stimulates the Production of Antibodies That Are Able to Opsonise Live *S. pneumoniae*

Figure 3:
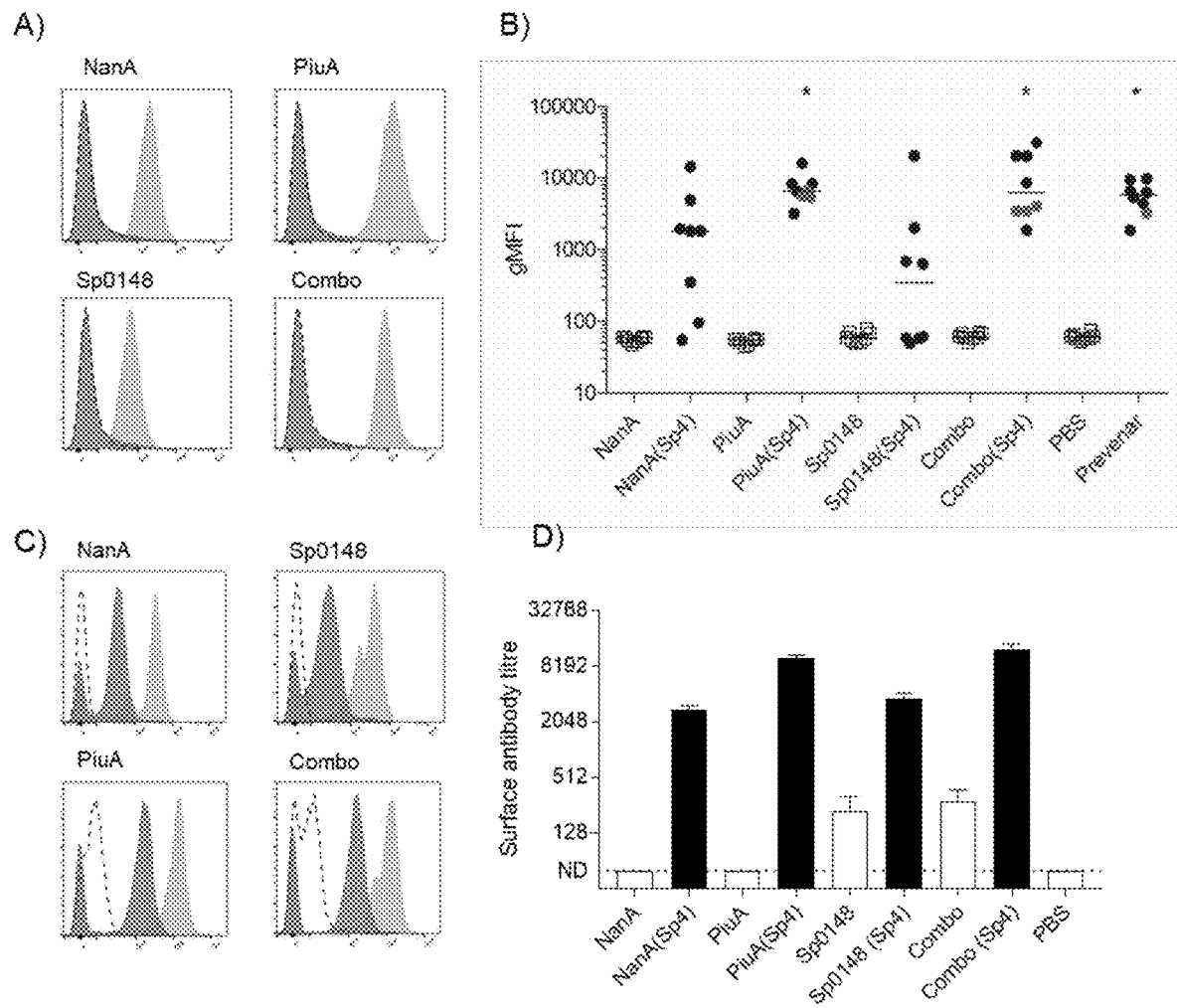
FIG. 3 shows flow cytometry analysis of antibody deposition on streptococcal species.

Flow cytometry assays were used to assess whether vaccination with PGCT glycoconjugates can lead to antibody recognition of live whole *S. pneumoniae*. To specifically investigate anti-capsular recognition, sera from the vaccinated groups were used to assess IgG binding to a *Streptococcus mitis* mutant expressing the *S. pneumoniae* serotype 4 capsule (*S. mitis* (SpT4)) (36). No recognition of wild type *S. mitis* was detected, but *S. mitis* (SpT4) was recognised by individual sera from all groups selected for study (FIG. 3A-B). The degree of IgG binding varied between vaccine groups, with sera from only four and six mice recognising *S. mitis* (SpT4) in the Sp0148 and NanA (Sp4) vaccinated groups respectively, whereas sera from all eight mice vaccinated with the PiuA glycoconjugate or all three protein glycoconjugates caused significant IG binding to *S. mitis* (SpT4) (FIG. 3B). For these two groups the level of antibody binding was comparable to that achieved for the Prevnar-13 vaccinated group. No antibody deposition on the *S. mitis* (SpT4) strain was seen in sera from mice vaccinated with any of the unglycosylated protein antigens, confirming a lack of cross reactivity between the pneumococcal carrier proteins and the *S. mitis* cell surface. These data support the ELISA results that while each of the novel glycoconjugates selected for study can stimulate an anti-Sp4 capsule immune response, a more robust response was stimulated by the PiuA glycoconjugate than the NanA and Sp0148 glycoconjugates.

Flow cytometry IgG binding assays were repeated using the TIGR4 strain. Incubation of TIGR4 with descending dilutions of pooled murine antiserum from the glycoconjugate vaccinated mice groups demonstrated dose dependent IgG binding (FIG. 3C). Comparison of the gMFI readings to a standard curve generated using antiserum from Prevnar-13 vaccinated mice revealed high surface antibody titres in the reactions incubated with serum from mice vaccinated with the four glycoconjugates (FIG. 3D). In addition, in sera from mice vaccinated with the unglycosylated Sp0148 or combination of all three proteins there were detectable levels of surface IgG binding (FIG. 3D). Surface deposition of IgG were no different to the negative control in sera obtained from NanA or PiuA unglycosylated antigens. To assess recognition of the individual protein antigens independent of antibody recognition of the capsule, IgG binding to *S. pneumoniae* with other capsular serotypes was assessed using a fixed concentration of pooled antiserum from mice vaccinated with each glycoconjugate. IgG recognition of non-serotype 4 strains in sera from vaccinated mice was generally weaker than for the TIGR4 strain, and varied between strains (FIG. 4A-D). While there was good levels of IgG binding to the serotype 23F strain, and reasonable levels to the serotype 2 strain, there was little binding to the 6B strain. The ability of different antigens to promote IgG binding varied between strains, with for example NanA inducing the weakest responses for the serotype 23F strain and Sp0148 for the TIGR4 strain, perhaps reflecting differences between the expression level and surface accessibility of individual protein antigens.

Figure 4:
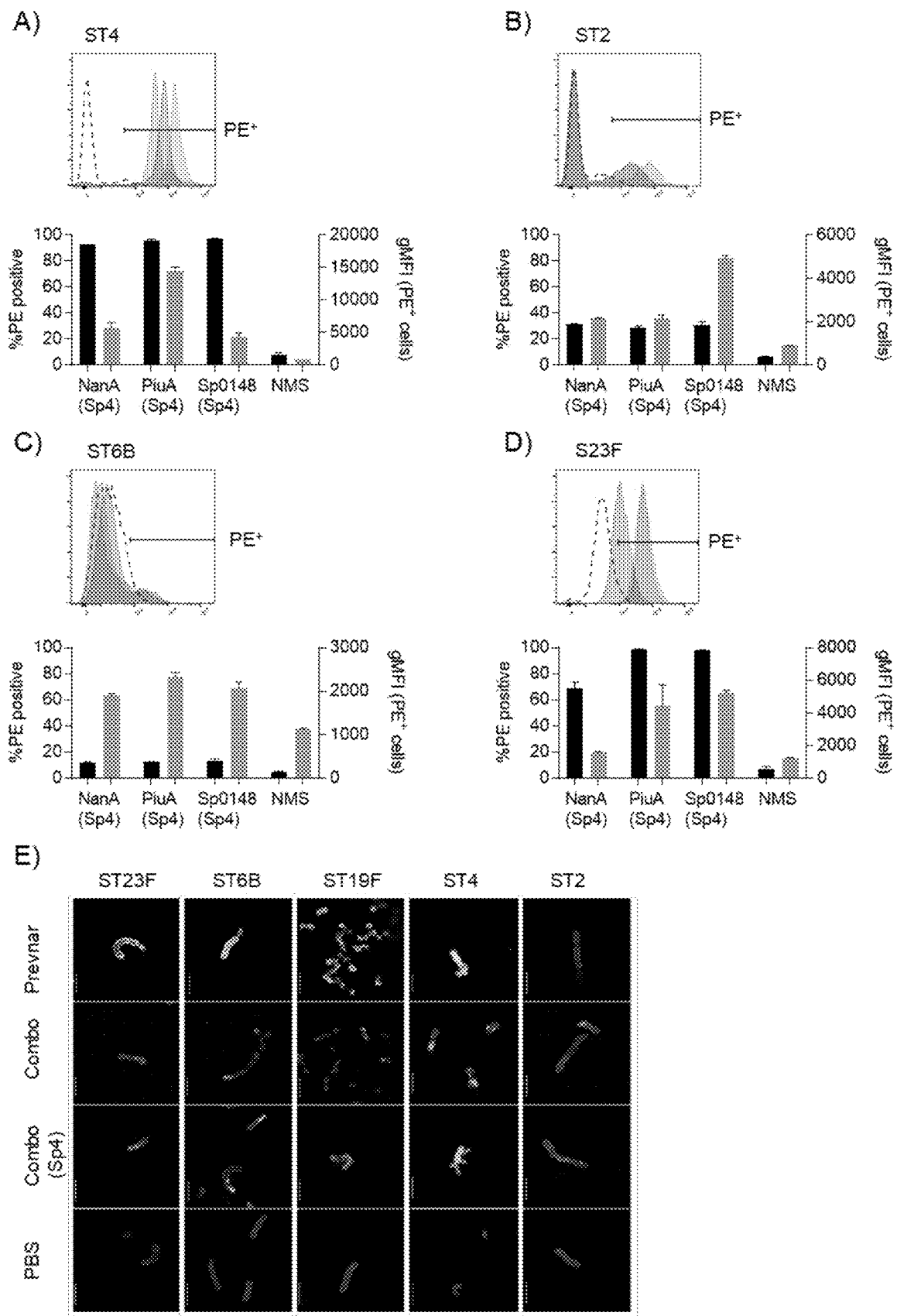
FIG. 4 shows antibody deposition on non-serotype 4 pneumococci.

2.4 Visualisation of Antibody Binding to *S. pneumoniae* in Sera From PGCT Glycoconjugate Vaccinated Mice Recognition of homologous and heterologous pneumococcal isolates was further investigated by fluorescence microscopy using antiserum from the combination vaccine groups and fluorescently labelled anti-mouse secondary antibodies (FIG. 4E). Incubation of the TIGR4 strain in sera from mice vaccinated with all three PGCT glycoconjugates resulted in bright, uniform surface staining across the bacterial cell similar to the results seen for sera from Prevnar-13 vaccinated mice, confirming a high level of IgG binding to the homologous serotype. In contrast, and in keeping with the flow cytometry data, fluorescent staining of the non-serotype strains in sera from PGCT glycoconjugated vaccinated mice was weaker, patchy, and more variable between strains. However, stained cocci were visible in all serotypes when sera from mice vaccinated with either a glycosylated or unglycosylated mix of all three protein antigens, including the serotype 2 strain that is not recognised by sera from Prevnar-13 vaccinated mice. Together the ELISA, flow cytometry and immunofluorescence data demonstrate that PGCT glycoconjugates can induce anti-capsular IgG responses that vary in strength between carrier proteins but which can be similar in strength (e.g. PiuA glycoconjugates) to that achieved after vaccination with Prevnar-13. In addition, the PGCT glycoconjugates stimulate significant antibody responses to protein antigens that can opsonise the heterologous *S. pneumoniae* serotypes and which potentially provide protection against multiple *S. pneumoniae* strains.

Figure 5:
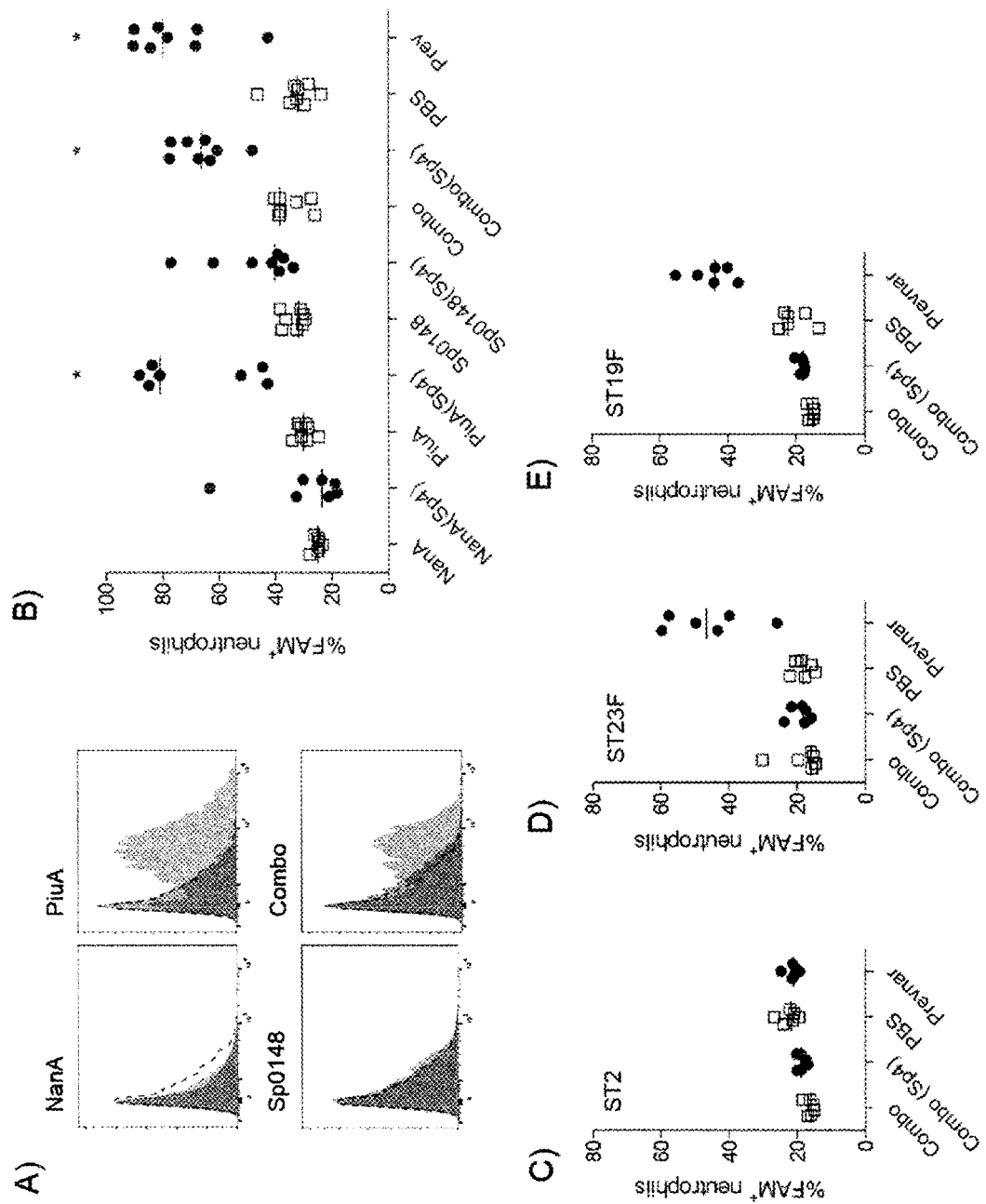
FIG. 5 shows the effect of antiserum samples on interaction of S. pneumoniae with human neutrophils.

2.5 Protective Efficacy of Vaccination of Mice With Recombinant Glycoconjugates Produced by PGCT To determine if the density of antibody deposition on TIGR4 was sufficient to promote opsonophagocytosis, neutrophil uptake assays were performed using freshly isolated human neutrophils (37). Incubation in sera from mice vaccinated with the PiuA (Sp4) glycoconjugate or a combination of glycoconjugates from all three proteins both promoted neutrophil uptake of the TIGR4 *S. pneumoniae* strain, indicating that a functional anti-capsular humoral immune response was being generated in response to recombinant type 4 capsular antigen made using PGCT (FIG. 5A). However, sera from mice vaccinated with the Sp0148 (Sp4), NanA (Sp4) or the unglycosylated proteins (individually or in combination) failed to promote neutrophil phagocytosis in this assay (FIG. 5B). The combination conjugates also failed to promote neutrophil phagocytosis for non-serotype 4 strains tested (FIG. 5C-E)

Figure 6:
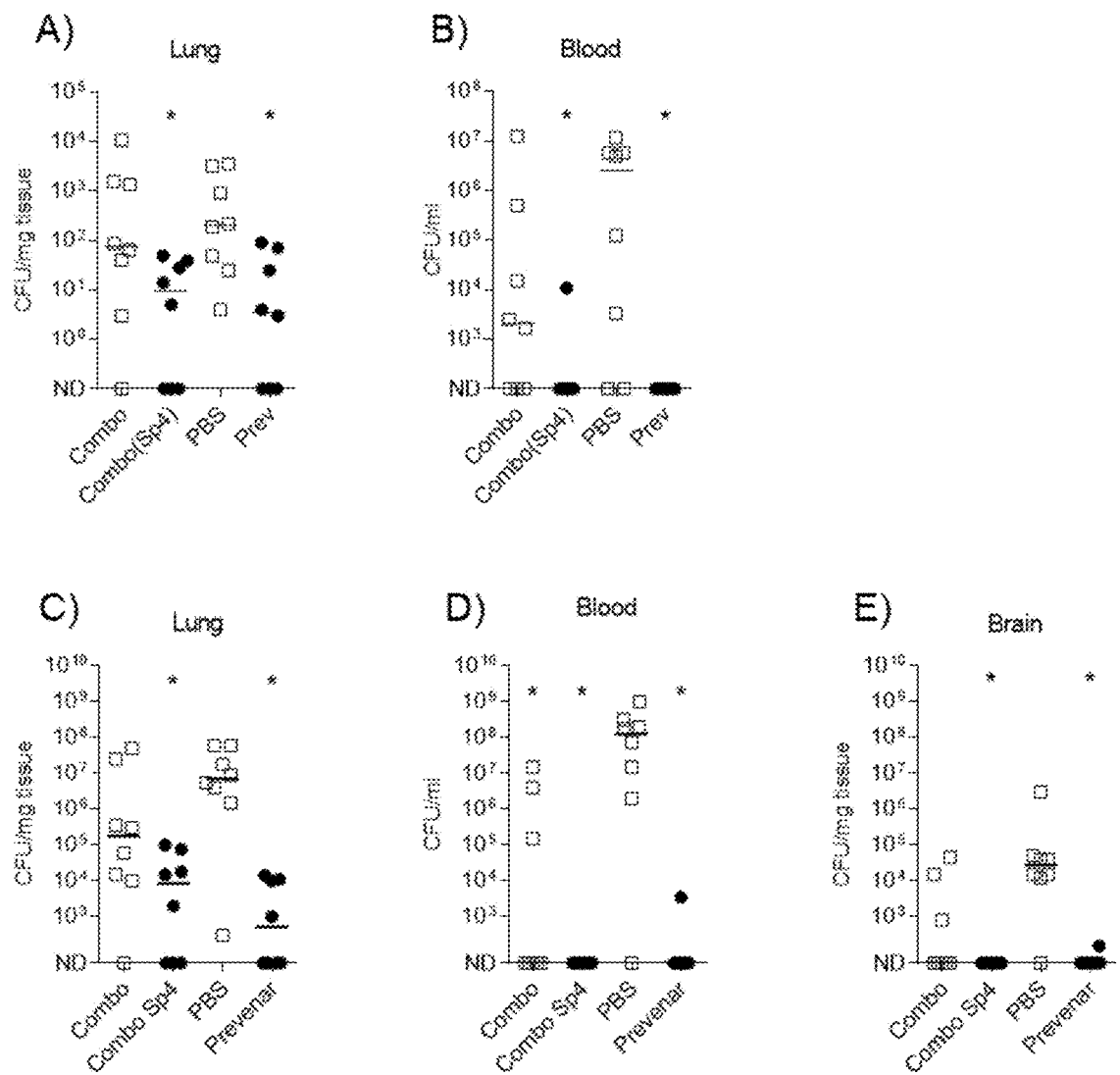
FIG. 6 shows that vaccination with recombinant glycoconjugates provides homologous but not heterologous protection against pneumococcal pneumonia. Mice were vaccinated with the glycosylated and unglycosylated combination vaccines and challenged intranasally with $1 \times 10^7$ CFU of TIGR4 for 48 h (7A-B) or Serotype 4 (7C-E). Bacterial burdens were determined by serial dilution and plating. *p<0.05 Kruskal-Wallis with Dunn's post-test (vs PBS).

Mouse models of infection were used to assess the protective efficacy of glycoconjugates made using PGCT. Mice were vaccinated with Prevnar, or a combination of all three PGCT glycoconjugates or of the unglycosylated proteins, and then challenged by intranasal inoculation of the TIGR4 strain (pneumonia with sepsis model) or the serotype 4 strain, which is known to cause meningitis. After 48 hours, mice were culled and the level of infection assessed using target organ CFU. In the TIGR4 challenge model, vaccination with the three PGCT glycoconjugates in combination almost completely prevented septicaemia and resulted in an approximately $\log_{10}$ reduction in lung CFU, a very similar level of protection to that provided by vaccination with Prevnar-13 (FIG. 6A-B). Although not statistically significant, there was also a reduction in median CFU/ml recovered from the blood in mice vaccinated with the combination of the unglycosylated proteins alone. In the meningitis model, vaccination with the three PGCT glycoconjugates in combination completely prevented septicaemia and meningitis, and resulted in an approximately 3 $\log_{10}$ reduction in lung CFU (FIG. 6C-E). Again, this was a very similar level of protection to that provided by vaccination with Prevnar-13. For mice vaccinated with the combination of the unglycosylated proteins alone, median blood, lung and brain CFU were all lower than results for the negative control although only the blood data were statistically significant. The data from these mouse models demonstrate that a *S. pneumoniae* capsular and protein antigen made using PGCT can be highly protective against infection with the homologous *S. pneumoniae* serotype, providing a level of protection as good as vaccination with an existing commercial PCV preparation. Furthermore, the protein components also generated a protective response independent of capsular antigen, suggesting a PGCT vaccine will be able to provide cross-serotype protection.

In the experiments above, protein glycan coupling technology is used to produce a low cost multicomponent, glycoconjugate vaccine that incorporates three surface antigens glycosylated with recombinant serotype 4 capsule. The findings include: (a) a *S. pneumoniae* glycoconjugate made using PGCT is as immunogenic as a commercial PCV and offers a similar level of protection in mouse models of pneumonia and meningitis; (b) a *S. pneumoniae* protein antigen can be used as a carrier protein for a PCV vaccine instead of one of the established conjugate vaccine carrier proteins; (c) the anti-capsular immunogenicity of a glycoconjugate made using PGCT varies markedly with the carrier protein; (d) the carrier proteins are immunogenic, stimulating an antibody response that is able to offer some degree of protection against meningitis and sepsis independent of capsular antibody. The data demonstrate that PGCT may provide an alternative methodology for manufacturing PCV that is cheaper than existing chemical conjugation methodologies and generates a similar level of serotype-specific protection that can be used in the developing world to prevent severe *S. pneumoniae* infections including meningitis. In addition, PGCT could make a PCV that includes a range of *S. pneumoniae* protein carrier proteins and thereby provide at least some degree of serotype-independent immunity.

A major finding from our data that has wide implications for vaccine development is the identification of additional carrier proteins that promote antibody responses to capsular antigens. At present only four proteins have been used for making glycoconjugates, but our data show that PiuA would be an additional option. The other two proteins used to make glycoconjugates, Sp_0148 and NanA, were considerably less effective at generating anti-glycan responses than PiuA. Indeed, it is conceivable that most of the anti-capsule response generated by the combination vaccine resulted from the presence of glycosylated PiuA. The reasons why there were such marked differences in the efficacy of the carrier protein in promoting anti-capsular antibody is not clear. Immunoblots suggested that this is not simply due to a greater quantity of PiuA glycoconjugate, as in fact the NanA glycoconjugate seemed to be the most abundant. The choice of carrier protein and site of glycosylation is important for the generation of a robust anti-capsule IgG response, and recent data suggest glycoconjugates generate an antibody response to glycan by presentation of a glycosylated epitope bound to MHCII directly to the T cell receptor (21, 22). This mechanism would explain our data, as the strength of the anti-capsular antibody responses will be affected by the choice of carrier protein, and perhaps by the site of covalent linkage to capsular antigen. These data suggest that screening additional *S. pneumoniae* proteins should identify additional carrier proteins for glycoconjugate vaccines that are able to result in strong antibody responses to capsular or other glycan antigens.

The major advantage of using *S. pneumoniae* protein antigens as carrier proteins for a PCV made using PGCT is that these proteins can induce an additional immune response that can be protective. This immune response to protein antigens could also include T cell mediated immunity including TH17 responses (24, 40) which could theoretically enhance mucosal immunity compared to pure antibody responses. We investigated whether a combination glycoconjugate produced using PGCT incorporating the type 4 pneumococcal capsule conjugated to three conserved *S. pneumoniae* protein antigens, the endothelial cell invasin NanA (29), the Th17 stimulating antigen Sp0148 (24) and the ABC transporter PiuA (34), could stimulate homologous and heterologous immunity against *S. pneumoniae*. Our data confirm that vaccination with the carrier proteins was able to generate a good antibody response that could recognise different strains of live *S. pneumoniae*. Vaccination with these proteins alone reduced bacterial CFU present in blood and meninges after challenge with *S. pneumoniae*, confirming the protective potential of antibody responses to the carrier protein component. However, despite selecting a known Th17 inducing antigen (SP_0148) vaccination with the proteins alone did not prevent infection at the lung level and the level of protection against systemic infection was weaker than that provided by anticapsular responses. Furthermore, the antibody responses to the three proteins differed in their ability to recognise different *S. pneumoniae* strains.

In summary, the data presented here demonstrate that PGCT can make a *S. pneumoniae* glycoconjugate that is as efficacious as an existing commercial PCV in preventing serotype specific infection but in addition can stimulate protective immunity against heterologous serotypes.

TABLE 1

| Species | Strain | Description |
| --- | --- | --- |
| *E. coli* | W3110 | K12 derivative |
| *E. coli* | W311B | W3110 derivative containing chromosomally inserted oligosaccharyltransferase PglB |
| *E. coli* | W3110 pB4-4 | W3110 containing Spn. type 4 capsule operon |
| *E. coli* | W311B pB4-4 | W311B containing Spn. type 4 capsule operon |
| *E. coli* | W3110 pEXT21(NanA)* | recombinant NanA production |
| *E. coli* | W3110 pEXT21(PiuA)* | recombinant PiuA production |
| *E. coli* | W3110 pEXT21(Sp0148)* | recombinant Sp0148 production |
| *E. coli* | W311B pB4-4 pEXT21(NanA) | glycosylated NanA production |
| *E. coli* | W311B pB4-4 pEXT21(PiuA) | glycosylated PiuA production |
| *E. coli* | W311B pB4-4 pEXT21(Sp0148) | glycosylated Sp0148 production |
| *E. coli* | W311B pB4-4 pEXT20 | Enhanced Sp4 glycosylation |
| *E. coli* | W311B pB4-4 pEXT21(NanA) pEXT20 | glycosylated NanA production |
| *E. coli* | W311B pB4-4 pEXT21(PiuA) pEXT20 | glycosylated PiuA production |
| *E. coli* | W311B pB4-4 pEXT21(Sp0148) pEXT20 | glycosylated Sp0148 production |
| *E. coli* | W3110 pB4-4 pEXT21(PiuA) pEXT20 | recombinant PiuA/LLO production |
| *S. pneumoniae* | TIGR4 | Serotype 4 |
| *S. pneumoniae* | D39 | Serotype 2 |
| *S. pneumoniae* | EF3030 | Serotype 19F |
| *S. pneumoniae* | 6B | Serotype 6B |
| *S. pneumoniae* | 23F | Serotype 23F |
| *S. mitis* | | *S. mitis* expressing WT capsule |
| *S. mitis* | | *S. mitis* expressing Spn. type 4 capsule |

*Used for vaccine production

REFERENCES

1. Jacobs D M Yung F, Hart E, Nguyen M N H, Shaver A. Trends in pneumococcal meningitis hospitalizations following the introduction of the 13-valent pneumococcal conjugate vaccine in the United States. Vaccine. 2017; 35(45):6160-5.
2. Polkowska A, et al BMJ Open. 2017; 7(5):e015080.
3. Hsu H E, Shutt K A, Moore M R, Beall B W, Bennett N M, Craig A S, et al. Effect of pneumococcal conjugate vaccine on pneumococcal meningitis. N Engl J Med. 2009; 360(3):244-56.
4. Bijlsma M W, Brouwer M C, Kasanmoentalib E S, Kloek A T, Lucas M J, Tanck M W, et al. Community-acquired bacterial meningitis in adults in the Netherlands, 2006-14: a prospective cohort study. Lancet Infect Dis. 2016; 16(3):339-47.
5. Alari A, Chaussade H, Domenech De Celles M, Le Fouler L, Varon E, Opatowski L, et al. Impact of pneumococcal conjugate vaccines on pneumococcal meningitis cases in France between 2001 and 2014: a time series analysis. BMC medicine. 2016; 14(1):211.
6. Pirez M C, Mota M I, Giachetto G, Sanchez Varela M, Galazka J, Gutierrez S, et al. Pneumococcal Meningitis Before and After Universal Vaccination With Pneumococcal Conjugate Vaccines 7/13, Impact on Pediatric Hospitalization in Public and Nonpublic Institutions, in Uruguay. Pediatr Infect Dis J. 2017; 36(10):1000-1.
7. Nhantumbo A A, Weldegebriel G, Katsande R, de Gouveia L, Come C E, Cuco A Z, et al. Surveillance of impact of PCV-10 vaccine on pneumococcal meningitis in Mozambique, 2013-2015. PLOS One. 2017; 12(6): e0177746.
8. Azevedo J, Dos Anjos E S, Cordeiro S M, Dos Santos M S, Escobar E C, Lobo P R, et al. Genetic profiles and antimicrobial resistance of *Streptococcus pneumoniae* non-PCV10 serotype isolates recovered from meningitis cases in Salvador, Brazil. J Med Microbiol. 2016; 65(10): 1164-70.
9. Hausdorff W P, Bryant J, Paradiso P R, Siber G R. Which pneumococcal serogroups cause the most invasive disease: implications for conjugate vaccine formulation and use, part I. Clin Infect Dis. 2000; 30(1):100-21.
10. Geno K A, Gilbert G L, Song J Y, Skovsted I C, Klugman K P, Jones C, et al. Pneumococcal Capsules and Their Types: Past, Present, and Future. Clin Microbiol Rev. 2015; 28(3):871-99.
11. Skov Sorensen U B, Yao K, Yang Y, Tettelin H, Kilian M. Capsular Polysaccharide Expression in Commensal *Streptococcus* Species: Genetic and Antigenic Similarities to *Streptococcus pneumoniae*. MBio. 2016; 7(6).
12. Miller E, Andrews N J, Waight P A, Slack M P, George R C. Herd immunity and serotype replacement 4 years after seven-valent pneumococcal conjugate vaccination in England and Wales: an observational cohort study. Lancet Infect Dis. 2011; 11(10):760-8.

13. Waight P A, Andrews N J, Ladhani S N, Sheppard C L, Slack M P, Miller E. Effect of the 13-valent pneumococcal conjugate vaccine on invasive pneumococcal disease in England and Wales 4 years after its introduction: an observational cohort study. Lancet Infect Dis. 2015; 15(5):535-43.
14. Bonten M J, Huijts S M, Bolkenbaas M, Webber C, Patterson S, Gault S, et al. Polysaccharide conjugate vaccine against pneumococcal pneumonia in adults. N Engl J Med. 2015; 372(12):1114-25.
15. van Hoek A J, Miller E. Cost-Effectiveness of Vaccinating Immunocompetent >/=65 Year Olds with the 13-Valent Pneumococcal Conjugate Vaccine in England. PLOS One. 2016; 11(2):e0149540.
16. Wacker M, Linton D, Hitchen P G, Nita-Lazar M, Haslam S M, North S J, et al. N-linked glycosylation in *Campylobacter jejuni* and its functional transfer into *E. coli*. Science. 2002; 298(5599):1790-3.
17. Kay E J, Yates L E, Terra V S, Cuccui J, Wren B W. Recombinant expression of *Streptococcus pneumoniae* capsular polysaccharides in *Escherichia coli*. Open Biol. 2016; 6(4):150243.
18. Linton D, Dorrell N, Hitchen P G, Amber S, Karlyshev A V, Morris H R, et al. Functional analysis of the *Campylobacter jejuni* N-linked protein glycosylation pathway. Mol Microbiol. 2005; 55(6):1695-703.
19. Donnelly J J, Deck R R, Liu M A. Immunogenicity of a *Haemophilus influenzae* polysaccharide-*Neisseria meningitidis* outer membrane protein complex conjugate vaccine. J Immunol. 1990; 145(9):3071-9.
20. Forsgren A, Riesbeck K, Janson H. Protein D of *Haemophilus influenzae*: a protective nontypeable *H. influenzae* antigen and a carrier for pneumococcal conjugate vaccines. Clin Infect Dis. 2008; 46(5):726-31.
21. Avci F Y, Li X, Tsuji M, Kasper D L. A mechanism for glycoconjugate vaccine activation of the adaptive immune system and its implications for vaccine design. Nat Med. 2011; 17(12):1602-9.
22. Stefanetti G, Hu Q Y, Usera A, Robinson Z, Allan M, Singh A, et al. Sugar-Protein Connectivity Impacts on the Immunogenicity of Site-Selective *Salmonella* O-Antigen Glycoconjugate Vaccines. Angew Chem Int Ed Engl. 2015; 54(45):13198-203.
23. Genschmer K R, Accavitti-Loper M A, Briles D E. A modified surface killing assay (MSKA) as a functional in vitro assay for identifying protective antibodies against pneumococcal surface protein A (PspA). Vaccine. 2013; 32(1):39-47.
24. Moffitt K L, Gierahn T M, Lu Y J, Gouveia P, Alderson M, Flechtner J B, et al. T(H)17-based vaccine design for prevention of *Streptococcus pneumoniae* colonization. Cell Host Microbe. 2011; 9(2):158-65.
25. Malley R, Trzcinski K, Srivastava A, Thompson C M, Anderson P W, Lipsitch M. CD4+ T cells mediate antibody-independent acquired immunity to pneumococcal colonization. Proc Natl Acad Sci USA. 2005; 102(13):4848-53.
26. Tu A H, Fulgham R L, McCrory M A, Briles D E, Szalai A J. Pneumococcal surface protein A inhibits complement activation by *Streptococcus pneumoniae*. Infect Immun. 1999; 67(9):4720-4.
27. Cheng Q, Finkel D, Hostetter M K. Novel purification scheme and functions for a C3-binding protein from *Streptococcus pneumoniae*. Biochemistry. 2000; 39(18):5450-7.
28. Janulczyk R, Iannelli F, Sjoholm A G, Pozzi G, Bjorck L. Hic, a novel surface protein of *Streptococcus pneumoniae* that interferes with complement function. J Biol Chem. 2000; 275(47):37257-63.
29. Uchiyama S, Carlin A F, Khosravi A, Weiman S, Banerjee A, Quach D, et al. The surface-anchored NanA protein promotes pneumococcal brain endothelial cell invasion. J Exp Med. 2009; 206(9):1845-52.
30. Yamaguchi M, Nakata M, Sumioka R, Hirose Y, Wada S, Akeda Y, et al. Zinc metalloproteinase ZmpC suppresses experimental pneumococcal meningitis by inhibiting bacterial invasion of central nervous systems. Virulence. 2017:1-9.
31. Mahdi L K, Wang H, Van der Hoek M B, Paton J C, Ogunniyi A D. Identification of a novel pneumococcal vaccine antigen preferentially expressed during meningitis in mice. J Clin Invest. 2012; 122(6):2208-20.
32. Cuccui J, Thomas R M, Moule M G, D'Elia R V, Laws T R, Mills D C, et al. Exploitation of bacterial N-linked glycosylation to develop a novel recombinant glycoconjugate vaccine against *Francisella tularensis*. Open Biol. 2013; 3(5):130002.
33. Riddle M S, Kaminski R W, Di Paolo C, Porter C K, Gutierrez R L, Clarkson K A, et al. Safety and Immunogenicity of a Candidate Bioconjugate Vaccine against *Shigella flexneri* 2a Administered to Healthy Adults: a Single-Blind, Randomized Phase I Study. Clin Vaccine Immunol. 2016; 23(12):908-17.
34. Brown J S, Ogunniyi A D, Woodrow M C, Holden D W, Paton J C. Immunization with components of two iron uptake ABC transporters protects mice against systemic *Streptococcus pneumoniae* infection. Infect Immun. 2001; 69(11):6702-6.
35. Bernatchez S, Szymanski C M, Ishiyama N, Li J, Jarrell H C, Lau P C, et al. A single bifunctional UDP-GlcNAc/Glc 4-epimerase supports the synthesis of three cell surface glycoconjugates in *Campylobacter jejuni*. J Biol Chem. 2005; 280(6):4792-802.
36. Wilson R, Cohen J M, Reglinski M, Jose R J, Chan W Y, Marshall H, et al. Naturally Acquired Human Immunity to Pneumococcus Is Dependent on Antibody to Protein Antigens. PLOS Pathog. 2017; 13(1):e1006137.
37. Reglinski M, Gierula M, Lynskey N N, Edwards R J, Sriskandan S. Identification of the *Streptococcus pyogenes* surface antigens recognised by pooled human immunoglobulin. Sci Rep. 2015; 5:15825.
38. Gessner B D, Mueller J E, Yaro S. African meningitis belt pneumococcal disease epidemiology indicates a need for an effective serotype 1 containing vaccine, including for older children and adults. BMC Infect Dis. 2010; 10:22.
39. Wacker M, Feldman M F, Callewaert N, Kowarik M, Clarke B R, Pohl N L, et al. Substrate specificity of bacterial oligosaccharyltransferase suggests a common transfer mechanism for the bacterial and eukaryotic systems. Proc Natl Acad Sci USA. 2006; 103(18):7088-93.
40. Zhang Z, Clarke T B, Weiser J N. Cellular effectors mediating Th17-dependent clearance of pneumococcal colonization in mice. J Clin Invest. 2009; 119(7):1899-909.
41. Terra et al (2012) J. Med. Microbiol. 61 919-926.
42. WO2009/104074
43. WO2014/114926

| Sequences |
|---|
| SEQ ID NO: 1 (PiuA coding sequence) with sequons (dashed underline), |
| GGATCCGAATTCCATTTTAAATAAGGAGGAATAACATAATGAAAAAGATTTGGCTGGCCTGGCCTGGTTTAGTTTTAGCGTTTAGCCATCCGGCGGCCAGGGAGGCGATCAGA |
| ACGCGACCGGTGGCGAGGTCAAACTTTCGGGGGAGAGCTCAACCCTACTGATACAGAAAGAGCCAGCCTTCTTCAGAGACTGAACTTTCTGCCA |
| TTAAAAGTTCACTGGACGAGGTCAAACTTTCCTGAAAGTTGTGACCTTTGACCTCGGCGCTGCGGATACTATTCGCGCTTTAGGATTTGAAAAAATATCTCG |
| GAATGCCTACAAAAACTGTTCCGACTTATCTAAAAGACCTAGTGGGAACTGTCAAAGAAATGTTGGTTCTATGAAAGAACCTGATTTAGAAGCTATCGCGCCCTTGAGCCTGATT |
| TGATTATCGCTTCGCCACGTACACAAAAATTCGTAGACAAATTCAAAGAAATCGCCCCAACCGTTCTCTTCCAAGCAAGCTAGACGAAGCATCCAAGAGTCGCTACTGGACTTCTACCAAGGCTAATA |
| TCGAATCCTTAGCAAGTGCCTTCGGCGAACTGGTACACAGAAGATTGACCAAGCCAAGAGCATCCAAGAGTCGCTACTACTAAAAATGAAAGCTCTGACA |
| AAAAAGCCCTTGCGATCCTCCTTAATGAAGGAAAAATGGCAGCCTTTGGTGTCAAAGAAATCACCCCTGACATCCTTGTCATCAACCGTACCCTTGCCATCGGTGGGGACAACTCTAGCAACG |
| AAGACTCACGCGCCACGACAAGAAGTCAGCTTTGAAGTGCAAAGAAATCACCCCTGACATCCTTGTCATCAACCGTACCCTTGCCATCGGTGGGGACAACTCTAGCAACG |
| ACGGTGTCCTAGAAAATGCCCTTATCGTGCTGAAACATCCAAATACCAACCTGGTATCTAAGGCGAGGCGACTTGAATCAACAA |
| AACTCATGATTGAAGACATACAAAAGCTTTGAAAGGAGGCGATCGAACCGCCACCGGTGCCATCACCATCATCACCATCATCACCATCATTAAGTCTAGAGGATCC |
| AACTCATGATTGAAGACATACAAAAGCTTTGAAAGGAGGCGATCGAACCGCCACCGGTGCCATCACCATCATCACCATCATCACCATCATTAAGTCTAGAGGATCC |
| SEQ ID NO: 2 PiuA amino acid sequence with sequons (solid underline), His tag (italics) and leader peptide (dotted underline). |
| MKKIWLALAG QGGDQNATGG ALVASFLLLL GACSTNSSTS QTETSSSAPT EVTIKSSLDE VKLSKVPEKI VTFDLGAADT |
| MKKIWLALAG LVLAFSASAA QGGDQNATGG ALVASFLLLL GACSTNSSTS QTETSSSAPT EVTIKSSLDE VKLSKVPEKI VTFDLGAADT |
| IRALGFEKNI VGMPTKTVPT YLKDLVGTVK NVGSMKEPDL EAIAALEPDL IIASPRTQKF VDKFKEIAPT VLFQASKDDY WTSTKANIES |
| LASAFGETGT QKAKEELTKL DKSIQEVATK NESSDKKALA ILLNEGKMAA FGAKSRFSFL YQTLKFKPTD TKFEDSRHGQ EVSFESVKEI |
| NPDILFVINR TLAIGGDNSS NDGVLENALI AETPAAKNGK IIQLTPDLWY LSGGGLESTK LMIEDIQKAL KGGDQNATGG *HHHHHHHH* |
| SEQ ID NO: 3 (PiuA amino acid sequence) |
| ALVASFLLLL GACSTNSSTS QTETSSSAPT EVTIKSSLDE VKLSKVPEKI VTFDLGAADT IRALGFEKNI VGMPTKTVPT YLKDLVGTVK |
| NVGSMKEPDL EAIAALEPDL IIASPRTQKF VDKFKEIAPT VLFQASKDDY WTSTKANIES LASAFGETGT QKAKEELTKL DKSIQEVATK |
| NESSDKKALA ILLNEGKMAA FGAKSRFSFL YQTLKFKPTD TKFEDSRHGQ EVSFESVKEI NPDILEVINR TLAIGGDNSS NDGVLENALI |
| AETPAAKNGK IIQLTPDLWY LSGGGLESTK LMIEDIQKAL K |
| SEQ ID NO: 4 (NanA coding sequence) |

```
Sequences

GGATCCGAATTCCATTTTAAATAAGGAGGAATAACATAATGAAAAAGATTTGGCTGCGCTGCTGGCTGCTGTTTAGTTTTAGCCGTTTAGCCCATCGGCGCGCAGGGAGGCGATCAGA
ACGCGACCGGTGGCGAGCGAACCTCTGGCAAATGAAACTCAACTTTCGGGGAGAGCTCAACCCTAACTGATGATACAGAAAAGAGCCAGCCCTTCTTCAGAGACTGAACTTTCTGGCA
ACGCGACCGGTGGCGAGCGAACCTCTGGCAAATGAAACTCAACTTTCGGGGAGAGCTCAACCCTAACTGATACAGAGAAAAGAGCCAGCCCTTCTTCAGAGACTGAACTTTCTGGCA
ATAAGCAAGAACAAGAAGAAAGATAAGCAAGAGAAAAATTCAAGAGATTACTATGCAGAGATTTGAAAACAGTTCGAAAACAGTGATAGAAAAAGAGATGTGAAACCA
ATGCTTCAAATGGTCAGAGAGTTGATTTATCAAGTGAACTAGATAAACTTGAAAACGCAACAGTTCACATGAGAGTTAAGCAGATGCGTGTTCGATGGGAAACAGTTTTACA
ATAATCTCTTTTCTGTGTCAAGTGCTACTAAAAAGATGAGTGATTTCACTATGCAGTTTACAATAATACTGTCACCCTAGAGGGGCGTGTTCGATGGGAAACAGTTTTACA
ATAATTACAACGATGCACCCTTAAAAGTTAAACCAGTCAGTGGACTCTGTGACTTTCACAGTTGAAAACCGACAGCAGAACTTCACCTAAAGGCCGAGTGCGCCTCTACGTAA
ACGGGGTATTATCTGAAGAAGCTCGAGATCTGGCAATTCATTAAAGATATGCCAGAAGAGTACAAAAACGTAGTCAACTTTTAAAGCGTCGCAAATCAAGAGTTATCGTATTCCAGCACTTCTCAAGACAGATAAAGGAA
CAAATCTACAGATTCGGAATCTCACTGTGTATAATCTGTTCTTAAACACCCAGAGAGTACAAAAACGCTAGTCAACTTTTAAAGCGTCGCAAATCAAGAGTTATCGTATTCCAGCACTTCTCAAGACAGATAAAGGAA
GAGCGGCTTTAACAGAGAAACGGACATATTCGAAAGCGGCGTACGGTAAAGCCCAAATAAAGATGGAATCAAGAGTTATCGTATTCTGAAGATAATGGTAAACTTGGGTGACCGAGTAACCA
CTTTGATCGCAGGTGCAGATGAACGCCGTCTCCATTCGAGTGACTGGGGTGATATCGGTATGGTCATCAGAGACGTAGTGAAGATAATGGTAAACTTGGGGTGACCGAGTAACCA
TTACCAACTTACGTGACAATGCAAAAGCTTCTGACCCATCAGCGGTTCGACCGACCATCGAGCGGATATATCGATATGGTTGTTCAAGATCCTGTTAAACCAAACCACCCAAAATCCTCTATCGTGAAGGAGAAAAAGGGAG
ACATGTTCCCAGAAGGGGAATCTTTGGAAATGTCTTCACAAAAGAAGAAGCCTACAAAAGAAATCGATGGAAAAATCGATGGAGACAGCTACAAGTGCCTATGTATCCTGTTAAACCAAACCAGCCTATGGCTATCCGGAAGACAT
CTTATACCAATTCGAGAAATTCTATACTTGTCTATACACAAACAAACTTCTCCATTTAGAATTGCCAAGATAGCTATCTATGATGTCCTCACAGTGATGACGGGAAGACAT
AGGGTAACCAATTACTAGGCAATATTACTCCCGATGGTCAATGTGTATCCTATTAGTGCCGCGATTGGAATCTTGGGTGTAGGTCCTGAATGTTACTTCGGATGGCCTCACAAAGGACGGTCAACG
GGTCAGCGCCTCAAGATATTACCGATGGTCAATGTGTATCATTCACTTAAATGGCTGCTGAAATTCTTGGGTGTAGGTCCTGAATGTTACTTCGGATGGCCTCACAAGGACGGTCAACG
TGATACCGGTTTATACGACTAATAATGTATCTCACTTAAATGGCTCGCAATCTTCTCGTATCATCCTATTCAGATGATCATGGAAAACTTGGCATGCTGAGAAGCGGTCAACG
ATAACCCTCAGGTAGACGGTCAAAAGATCCACTCTTCTACGATGAACATGACTGTGCCAAAATACAGAATCAACGGTTGTACAACTAAACAATGGATGATGTCTATGTTCAAATGTCTG
TGCGTGGTTTGACTGGAGATCTTCAGGTTGCTACAGAAGTCAAGAGATCAAAAAAGATATTCCTCCAAGAGTTGACTTGGAGACCGGAGAACGTGAAAATGGGAGTATGGTGGAGTCCACCGGTGCCACGTGTCGAAGAAATACTGAAAAGATGTGAGTTGA
CTATCCATGATGCAAACACAATCCAATTCAAAAAGGAGAGTTTGCCTATAATTCGCTCCAGTAATGCCTATAATTCGCTCCAGTAATGCGTATAATTCGCTCCAGTAATGCCTAGTAATTAGGACGCGAAAATCGTATTGATACAATAGAGGAAATGGGCAAGGGAACTAGAGAGATGGGCAAGGGAGAGATGGGAGGAGAATGGGCAAGAGAGGACGAGTATTGCT
CCTATATCCCTATCATTTAGAAAATTTAATTGGGACTTTTGAGCAAATCAAGCAAGTGTAAAACACCGCGTTCATGACCCAGTATGATACAAACCCTCTATTTACAGTGG
TGGAGTTCGACTCAGAAGTATTGGTCAACAAGGCTCCAACCCCTTCAACCCCTCTAAAACAACAGGCGTTCATGACCCAGTATGATACAAAACCCTCTATTTACAGTGG
ATTCAGAGGATATGGGTCAAAAAGTTACAGGTTTGGCAGAGAGGTGCAATTGAAAGTTAGGTATGCATAATTGAAAAGTATGCACTAACTTTACCTAAGCTTTCGAATGGAATGAACGAA
GTGAAGCTGCTGTTCATGAAGTCATGAAGTCATTAGGACATCCGGCAGAATACAGGACCGAAGAGCCAGATCACAAGTCCAACAGTCCAACAGTCGAGAAGCCAGTTCAACAGTCCAACAGTCGAGAAGCCAGAATACACAGGGACATCCG
```

GCGAAGAGCCAGCCCCGACAGTCGAGAAGCCAGAATACACAGGCCCCACTAGGACAGCTCCAACAGTCGAGAAGCAGCCAGAATTTACAGGGGAGTTAATG
GTACAGAGCCAGCTGTTCATGAAATCGCAGAGTATAAGGATCTGATTCGCTTGAACTCTTGTAACTTCTTACAAAAGAAGATTATACTTACAAAGTCTCTTGCTCAGCAGGCACTTC
CTGAAACAAGGAGAACAAGGAGAGTGACCTCCTAGGACTAACAGCTTTCTTCCCTTGGTCTGTTTTACGCTAGGGAGAAAAGAGAGAACAAGAGGCGATCAGAACCGA
CCGGTGCCCATCATCATCATCATCATCACCATCATTAATTAAGTCTAGAGGATCC

SEQ ID NO: 5 NanA amino acid sequence with sequons (solid underline), His tag (italics) and leader peptide (dotted underline).

MKKIWLALAG LVLAFSASAA QGGDQNATGG EQPLANETQL SGESSTLTDT EKSQPSSETE LSGNKQEQER KDKQEEKIPR DYYARDLENV ETVIEKEDVE
TNASNGQRVD LSSELDKLKK LENATVHMEF KPDAKAPAFY NLFSVSSATK KDEYFTMAVY NNTATLEGRG SDGKQFYNNY NDAPLKVKPG QWNSVTFTVE
KPTAELPKGR VRLYVNGVLS RTSLRSGNFI IGATKRANNT VWGSNLQIRN LTVYNRALTP EEVQKRSQLF KRSDLEKKLP EGAALTEKTD
IPESGRNGKP NKDGIKSYRI PALLKTDKGT KDMPDVTHVQ IGATKRANNT HSSDWGDIGM VIRRSEDNGK TWGDRVTITN LRDNPKASDP SIGSPVNIDM VLVQDPETKR
IPSIYDMFPE GKGIFGMSSQ KEEEAYKKIDG KTYQILYREG EKGAYTIREN GTVYTPDGKA TDYRVVVDPV KPAYSDKGDL YKGNQLLGNI YFTTNKTSPF
RIAKDSYLWM SYSDDDGKTW SAPQDITPMV KADWMKFLGV GPGTGIVLRN GPHKGRILIP VYTTNNVSHL NGSQSSRIIY SDDHGKTWHA GEAVNDNRQV
DGQKIHSSTM NNRRAQNTES TVVOLNNGDV KLEMRGLTGD LOVATSKDGG VTWEKDIKRY PQVKDVYVQM SAIHTMHEGK EYIILSNAGG PKRENGMVHL
ARVEENGELT WLKHNPIQKG EFAYNSLQEL GNGEYGILYE HTEKGQNAYT LSFRKENWDF LSKDLISPTE AKVKRTREMG KGVIGLEFDS EVLVNKAPTL
QLANGKTARF MTQYDTKTLL FTVDSEDMGQ KVTGLAEGAI ESMHNLPVSV AGTKLSNGMN GSEAAVHEVP EYTGPLGTSG EEPAPTVEKP EYTGPLGTSG
EEPAPTVEKP EYTGPLGTAG EEAAPTVEKP EFTGGVNGTE PAVHEIAEYK GSDSLVTLTT KEDYTYKAPL AQQALPETGN KESDLLASLG LTAFFLGLFT
LGKKREQGGD QNATGHHHHH HHHHHH

SEQ ID NO: 6 (NanA amino acid sequence)

EQPLANETQL SGESSTLTDT EKSQPSSETE LSGNKQEQER KDKQEEKIPR DYYARDLENV ETVIEKEDVE TNASNGQRVD LSSELDKLKK LENATVHMEF
KPDAKAPAFY NLFSVSSATK KDEYFTMAVY NNTATLEGRG SDGKQFYNNY NDAPLKVKPG QWNSVTFTVE KPTAELPKGR VRLYVNGVLS RTSLRSGNFI
KDMPDVTHVQ IGATKRANNT VWGSNLQIRN LTVYNRALTP EEVQKRSQLF KRSDLEKKLP EGAALTEKTD IPESGRNGKP NKDGIKSYRI PALLKTDKGT
LIAGADERRL HSSDWGDIGM VIRRSEDNGK TWGDRVTITN LRDNPKASDP SIGSPVNIDM VLVQDPETKR IPSIYDMFPE GKGIFGMSSQ KEEEAYKKIDG
KTYQILYREG EKGAYTIREN GTVYTPDGKA TDYRVVVDPV KPAYSDKGDL YKGNQLLGNI YFTTNKTSPF RIAKDSYLWM SYSDDDGKTW SAPQDITPMV
KADWMKFLGV GPGTGIVERN GPHKGRILIP VYTTNNVSHL NGSQSSRIIY SDDHGKTWHA GEAVNDNRQV DGQKIHSSTM NNRRAQNTES TVVOLNNGDV
KLFMRGLTGD LOVATSKDGG VTWEKDIKRY PQVKDVYVQM SAIHTMHEGK EYIILSNAGG PKRENGMVHL ARVEENGELT WLKHNPIQKG EFAYNSLQEL
GNGEYGILYE HTEKGQNAYT LSFRKENWDF LSKDLISPTE AKVKRTREMG KGVIGLEFDS EVLVNKAPTL QLANGKTARF MTQYDTKTLL FTVDSEDMGQ

-continued

Sequences

KVTGLABEGAI ESMHNLPVSV AGTKLSNGMN GSEAAVHEVP EYTGPLGTSG EEPAPTVEKP EYTGPLGTSG EEPAPTVEKP EYTGPLGTAG EEAAPTVEKP
EFTGGVNGTE PAVHEIAEYK GSDSLVTLTT KEDYTYKAPL AQQALPETGN KESDLLASLG LTAFFLGLFT LGKKREQ

SEQ ID NO: 7 Sp0148 coding sequence

GGATCCGAATTCCATTTTAAATAAGGAGGAATAACATAAGAAAAGATTTGGCTGCGCTGCCTGTTTAGTTTTAGCCGTTGGCGCGCAGGAGGCGATCAGA
ACGCGACCGGTGGCGCAGCCCTTGCTCTTGTTGCTGCAGGTGTGCTTGCGCAGGGGTGCTAAGAAAGAAGGAGAAGCAGCTAGCAAGAAGAAATCATCGTTGC
ACGCGACCGGTGGCGCAGCCCCTTGCTCTTGTTGCTGCAGGTGTGCTTGCGCAGGGGTGCTAAGGGGTGCTAAGAAAGAAGAGAAGAAGCAGCTAGCAAGAAGAAATCATCGTTGCAA
CCAATGGATCACCAAAGCCATTTATCTATGAAGAAATGGGCGAATTGACTGTTCAGGAGATTGAAGTCGTTCGCGTTGCTATCTTTAAAGATTCTGACAAATATGATGTCAAGTTTG
AAAAGACAGAATGGTCAGGTGTCTTTTGCTGGTCTTGACGCTGATATCGTTGACGCTGATCGTTCTGACATATGCTGTCAACAATCTTAGCTACACTAAAGACGTGCGGAGAAATACCTCTATGCCGCAC
CAATTGCCCAAAATCCTAATGTCCTTGTCGTTGAAGAAGAAGATGACTCTAGTATCAAGTCTCGATGATATCGGTGAAAATCGACGGAAGTCGTTCAAGCCACTACATCAGCTA
AGCAGTTAGAAGCATACAATGCTGAACACATGGACAACACCAAGTTGGACAACTAGAAGTTATCGAACTTCCAAGCGACCAACAACCGTACGTTTACCCACTTCTTGCTC
AGATTTTGATAAATCGGTGTTGAAGAAGCAGTGATCAAGAACGCATCAAAGAACGCATCAAAGAACCAAGTTTGGACAACTAGAAGTTATCGAACTTCCAAGCGACCAACAACCGTACGTTTACCCACTTCTTGCTC
AGGGTCAAGATGAGTTGAAAATCGTTGTAGACAACAACGCATCAGAACCGACCGGTGCTGGCCATCCACCATCACCATCACCATCATTAATTAAGCTTAGAGGATCC
AAGCTGATATTAAAGGAGGCGATCAGAACCGACCGGTGCTGGCCATCCACCATCACCATCACCATCATTAATTAAGCTTAGAGGATCC

SEQ ID NO: 8 Sp0148 amino acid sequence with sequons (solid underline), His tag (italics) and leader peptide (dotted underline).

MKKIWLALAG LVLAFSASAA QGGDQNATGG AALALVAAGV LAACSGGAKK EGEAASKKEI IVATNGSPKP FIYEENGELT GYEIEVVRAI FKDSDKYDVK
FEKTEWSGVF AGLDADRYNM AVNNLSYTKE RAEKYLYAAP IAQNPNVLVV KKDDSSIKSL DDIGGKSTEV VQATTSAKQL EAYNAEHTDN PTILNYTKAD
LQQIMVRLSD GQPDYKIFDK IGVETVIKNQ GLDNLKVIEL PSDQQPYVYP LLAQGQDELK SEVDKRIKEL YKDGTLEKLS KOFFGDTYLP AEADIKGGDQ
NATGGHHHHH HHHHH

SEQ ID NO: 9 (Sp0148 amino acid sequence)

MKKIWLALAG LVLAFSASAA AALALVAAGV LAACSGGAKK EGEAASKKEI IVATNGSPKP FIYEENGELT GYEIEVVRAI FKDSDKYDVK
FEKTEWSGVF AGLDADRYNM AVNNLSYTKE RAEKYLYAAP IAQNPNVLVV KKDDSSIKSL DDIGGKSTEV VQATTSAKQL EAYNAEHTDN PTILNYTKAD
LQQIMVRLSD GQPDYKIFDK IGVETVIKNQ GLDNLKVIEL PSDQQPYVYP LLAQGQDELK SFVDKRIKEL YKDGTLEKLS KOFFGDTYLP AEADIK

SEQ ID NO: 10 (Campylobacter jejuni PglB amino acid sequence)

1   mlkkeylkmp   ylvlfamiil   ayvfsvforf   ywwwasefn   eyffnnqlmi   isndgyafae

-continued

| Sequences | | | | | | |
| --- | --- | --- | --- | --- | --- | --- |
| 61 | gardmiagfh | qpndlsyygs | slstltywly | kitpfsfesi | vlymstflss | lvvipiilla |
| 121 | neykrplmgf | vaallasian | syynrtmsgy | ydtdmlvivl | pmfilffmvr | milkkdffsl |
| 181 | ialplfigiy | lwwypssytl | nvaliglfli | ytlifhrkek | ifyiavisss | ltlsniawfy |
| 241 | qsaiivilfa | lfaleqkrln | fmiigilgsv | tliflilsgg | vdpilyqlkf | yifrsdesan |
| 301 | ltqgfmyfnv | nqtiqevenv | dlsefmrris | gseivflfsl | fgfawllrkh | ksmimalpil |
| 361 | vlgflalkgg | lrftiysvpv | malgfgills | efkailvkky | sqltsnvciv | fatiltlapv |
| 421 | fihiynykap | tvfsqneasl | Inqlknianr | edyvvtwwdy | gypvryysdv | ktlvdggkhl |
| 481 | gkdnffpsfa | lskdegaaan | marlsveyte | ksfyalqndi | lktdilqamm | kdynqsnvdl |
| 541 | flaslskpdf | kidtpktrdi | ylymparmsl | ifstvasfaf | inldtgvldk | pftfstaypl |
| 601 | dvkngeiyls | ngvvlsddfr | sfkigdnvvs | vnsiveinsi | kqgeykitpi | ddkaqfyify |
| 661 | lkdsaipyaq | filmdktmfn | sayvqmfflg | nydknlfdsv | insrdakvfk | lki |

What is claimed is:

1. A glycoconjugate comprising an isolated *S. pneumoniae* protein antigen glycosylated with an isolated *S. pneumoniae* capsular polysaccharide, wherein the isolated protein antigen is *S. pneumoniae* Sp0148 protein antigen comprising an amino acid sequence having at least 80% sequence identity to SEQ ID NO: 9.

2. The glycoconjugate according to claim 1, wherein the Sp0148 protein antigen comprises a heterologous glycosylation sequon comprising the sequence D/E-Y-N-X-S/T, wherein Y and X are any amino acid except proline.

3. The glycoconjugate according to claim 2, wherein the protein antigen comprising the heterologous glycosylation sequon comprises an amino acid sequence having at least 80% sequence identity to the amino acid sequence of SEQ ID NO: 8.

4. The glycoconjugate according to claim 2, wherein the protein antigen comprises two or more of the heterologous glycosylation sequons.

5. The glycoconjugate according to claim 1, wherein the capsular polysaccharide is *S. pneumoniae* serotype 4 capsular polysaccharide.

6. A composition comprising the glycoconjugate according to claim 1 and a pharmaceutically acceptable excipient.

7. The composition according to claim 6 further comprising an adjuvant.

\* \* \* \* \*